(12) United States Patent
Nakabe et al.

(10) Patent No.: US 7,726,577 B2
(45) Date of Patent: Jun. 1, 2010

(54) CONTACTLESS CARD

(75) Inventors: Futoshi Nakabe, Hiroshima (JP); Eiji Ueda, Kure (JP)

(73) Assignee: Panasonic Corporation, Osaka (JP)

( * ) Notice: Subject to any disclaimer, the term of this patent is extended or adjusted under 35 U.S.C. 154(b) by 299 days.

(21) Appl. No.: 10/586,440

(22) PCT Filed: Apr. 7, 2005

(86) PCT No.: PCT/JP2005/007194
§ 371 (c)(1),
(2), (4) Date: Jul. 18, 2006

(87) PCT Pub. No.: WO2005/101289
PCT Pub. Date: Oct. 27, 2005

(65) Prior Publication Data
US 2008/0230612 A1    Sep. 25, 2008

(30) Foreign Application Priority Data
Apr. 14, 2004 (JP) ............................. 2004-118807

(51) Int. Cl.
*G06K 5/00* (2006.01)
(52) U.S. Cl. ...................... 235/492; 235/380
(58) Field of Classification Search .............. 235/492, 235/380
See application file for complete search history.

(56) References Cited

U.S. PATENT DOCUMENTS

| | | | |
|---|---|---|---|
| 6,111,951 A * | 8/2000 | Guenther | 235/375 |
| 6,168,083 B1 * | 1/2001 | Berger et al. | 235/492 |
| 6,462,647 B1 * | 10/2002 | Roz | 340/10.1 |
| 2002/0186838 A1 * | 12/2002 | Brandys | 380/30 |
| 2003/0094491 A1 * | 5/2003 | Nakabe et al. | 235/451 |

FOREIGN PATENT DOCUMENTS

DE    101 61 302    7/2003

OTHER PUBLICATIONS

"Identification Cards—Contactless Integrated Circuit(s) Cards—Proximity Cards—Proximity Cards—Cartes D'Identification—Cartes A Circuit(s) Integre(s) Sans Contact Cartes De Proximite," International Standard ISO/IEC, Feb. 1, 2001, pp. I-VII, 1, XP001146902.
"Identification Cards—Contactless Integrated Circuit(s) Cards—Proximity Cards -," ISO/IEC 14443-3, Jun. 11, 1999.

* cited by examiner

*Primary Examiner*—Michael G Lee
*Assistant Examiner*—Rafferty Kelly
(74) *Attorney, Agent, or Firm*—Wenderoth, Lind & Ponack, L.L.P.

(57) ABSTRACT

The present invention aims at providing a contactless card that enables a reader/writer to identify which card such reader/writer is communicating with in a set of card identification processes and that improves the possibility of protecting the cardholder's privacy. Contactless card (200) includes: power detection unit (203); random number ID generation unit (210) that determines an identifier that identifies card (200), every time power detection unit (203) detects that electric power has been supplied; ID storage unit (2081) that holds the determined identifier; sending/receiving circuit (204) that receives a command requesting that the identifier that identifies card (200) should be sent to reader/writer (100), and sending/receiving circuit (204) sends, to reader/writer (100), the determined identifier in the case where the received command is a first-received command, and the held identifier in the case where the received command is a second- or later-received command.

18 Claims, 25 Drawing Sheets

Header: Initial response header
PUPI: Card ID (Pseudo-Unique PICC Identifier)
APP Data: Application information
Protocol Inf: Protocol information
CRC: CRC value from header to Protocol Inf

CONTACTLESS CARD

TECHNICAL FIELD

The present invention relates to a contactless card that communicates with a reader/writer wirelessly.

BACKGROUND ART

Conventionally, the timeslot method has been used for a communication between a contactless card that sends/receives data and a reader/writer that identifies the contactless card, using the electromagnetic induction method or the like. In the case where plural contactless cards simultaneously exist within a communication area covered by a reader/writer and such plurality of contactless cards simultaneously send response signals in response to polling performed by the reader/writer, any of the contactless cards cannot normally communicate with the reader/writer due to the collision of response signals. The timeslot method prevents the occurrence of such situations.

The following describes how a communication is carried out in accordance with the timeslot method.

(1) The reader/writer sends a request command in order to detect the presence of a contactless card. The request command includes "slot number" which is the number of time periods (timeslots) in which the contactless card can make an initial response.

(2) After receiving the request command, the contactless card returns an initial response that includes its card ID in one of the timeslots. The contactless card determines, on its own, a timeslot in which it makes an initial response.

(3) When detecting a collision of initial responses, the reader/writer sends a request command again. As a result, the counting of the timeslots restarts.

(4) The reader/writer can identify all contactless cards when no collision of initial responses is detected in any of the timeslots. This marks the completion of the card identification processing.

As a contactless card identification method employed by a reader/writer, there also exists the slot maker method in which a reader/writer notifies a contactless card of timing at which the contactless card can make an initial response. Also in this method, the contactless card determines, on its own, a timeslot in which it makes an initial response.

In order that a reader/writer identifies each contactless card, a contactless card is required to use a card ID by which it is possible to distinguish such contactless card from another contactless card. Through the use of a card ID, the reader/writer identifies a contactless card such reader/writer is communicating with. The above methods are standardized as ISO/IEC14443-3 (Type B, initialization and anticollision scheme).

DISCLOSURE OF INVENTION

However, conventional contactless cards include a Read Only Memory (ROM) that stores a specific value, and such value is used as a card ID. Thus, it is possible for a third party to estimate that the card ID that is used when the contactless card makes an initial response is an identifier to identify a person who holds the contactless card (hereinafter referred to as a "cardholder"). This could lead to a violation of the cardholder's privacy.

A contactless card returns an initial response that includes its card ID in response to a request command sent from a reader/writer. Therefore, it is possible to identify the range and time of the cardholder's activities by recording initial responses using plural readers/writers installed at different places and then by analyzing the recorded initial responses. Thus, when the same card ID is constantly used, it is possible that the activities of the cardholder of the contactless card using such card ID are identified and his/her privacy is violated.

In order to address the above problem, it is conceivable that a contactless card that has received a request command sent from a reader/writer makes an initial response, using a card ID that the reader/writer changes for each request command it receives. However, when a card ID is changed for each request command, it becomes impossible for the reader/writer to communicate with a contactless card that uses a specific card ID. A contactless card is required to use the same card ID through a set of card identification processes. "A set of card identification processes" refers to processes to be performed from when a reader/writer sends a request command to a contactless card for the first time until when the reader/writer identifies such contactless card.

The present invention has been conceived in view of the above problem, and it is an object of the present invention to provide a contactless card that enables a reader/writer to identify which contactless card such reader/writer is communicating with in a set of card identification processes and that improves the possibility of protecting the cardholder's privacy.

In order to achieve the above problem, a contactless card of the present invention is a contactless card that communicates with a reader/writer after being supplied with electric power, including: a power detection unit that detects electric power enough to communicate with the reader/writer; an identifier determination unit that determines an identifier that identifies the contactless card, every time the power detection unit detects the enough electric power; a determined identifier storage unit that holds the identifier determined by the identifier determination unit; a receiving unit that receives, from the reader/writer, a command requesting that the identifier that identifies the contactless card should be sent to the reader/writer; and a sending unit that sends, to the reader/writer, (i) the identifier determined by the identifier determination unit in the case where the command received by the receiving unit is a first-received command, and (ii) the identifier held in the determined identifier storage unit in the case where the command received by the receiving unit is a second- or later-received command. Here, "detects electric power enough to communicate with the reader/writer" means to detect that electric power has been supplied. Furthermore, "the power detection unit detects the enough electric power" means that the power detection unit detects that electric power has been supplied.

The identifier determination unit determines an identifier that identifies the contactless card every time the power detection unit detects the enough electric power. Accordingly, it is possible to increase the possibility that an identifier that is difficult for a third party to guess is determined every time the power detection unit detects the enough electric power. Therefore, it is difficult for a third party to identify the activities of the cardholder even when identifiers used by the contactless card of the present invention are recorded and analyzed. In other words, the contactless card according to the present invention improves the possibility of protecting the cardholder's privacy.

Furthermore, the sending unit sends the determined identifier or the identifier held in the determined identifier storage unit that is the same as the determined identifier. Accordingly, it becomes possible for the reader/writer to perform a communication, recognizing that such reader/writer is communicating with the contactless card of the present invention.

The identifier determination unit may generate an identifier every time the power detection unit detects the enough electric power, and may determine the generated identifier as the identifier that identifies the contactless card.

The identifier determination unit may generate the identifier made up of a fixed value portion and a random number portion. Accordingly, it becomes possible for the fixed value portion in the identifier of the contactless card according to the present invention to include the card issuer's ID, the service type, or the like. The object of the present invention is achievable by the random number portion. Therefore, it is possible for the reader/writer to obtain the card information by checking the fixed value portion in the identifier. Furthermore, it becomes possible to prevent the activities of the cardholder from being identified.

The contactless card of the present invention may further include a candidate identifier storage unit that holds candidate identifiers, wherein the identifier determination unit may select one of the candidate identifiers held in the candidate identifier storage unit every time the power detection unit detects the enough electric power, and may determine the selected candidate identifier as the identifier that identifies the contactless card.

The identifier determination unit determines the identifier using a random number. With this structure in which an identifier is determined using a random number, it becomes impossible for a third party to guess the determined identifier. Furthermore, it becomes impossible for a third party to guess a next identifier to be generated.

The contactless card of the present invention may further include a communication end detection unit that detects an end of a communication between the reader/writer and the receiving unit and the sending unit, wherein the identifier determination unit may determine a new identifier and the determined identifier storage unit may hold the new identifier in the case where the communication end detection unit detects the end of the communication.

After the end of a communication carried out with the contactless card, the reader/writer can regard such contactless card as a different card in a later communication. This allows the contactless card to change the identifier thereof. Accordingly, it becomes possible to further improve the possibility of preventing the privacy of the cardholder of the contactless card from being violated.

The communication between the reader/writer and the contactless card is in compliance with ISO/IEC14443, and the identifier sent by the sending unit is set as a Pseudo-Unique Proximity Integrated Circuit Card (PICC) identifier included in a response to a request command that is sent from the reader/writer to the contactless card.

A contactless card of the present invention may further include: a mode judgment unit that judges an operation mode in which the contactless card operates; a random identifier generation unit that generates an identifier in a random manner; and a specific identifier generation unit that generates a specific identifier, wherein the identifier determination unit may determine one of the following identifiers as the identifier that identifies the contactless card based on the judgment made by the mode judgment unit: the identifier generated by the random identifier generation unit; and the identifier generated by the specific identifier generation unit.

The contactless card according to the present invention determines an identifier depending on the operation mode. Accordingly, in the case where the cardholder does not care about his/her privacy, the use of a specific identifier (fixed identifier or the like) enables such cardholder to receive a special service. In contrast, when the cardholder cares about his/her privacy, the use of a randomly generated identifier results in improved convenience of the cardholder.

The operation mode may include: an inspection mode indicating that the contactless card is in an inspection process; and a use mode indicating that the contactless card is in use by a public user, and the identifier determination may (i) determine, in the inspection mode, that the identifier generated by the specific identifier generation unit is the identifier that identifies the contactless card, and (ii) determine, in the use mode, that the identifier generated by the random identifier generation unit is the identifier that identifies the contactless card.

The use of the contactless card according to the present invention allows an inspection machine to use a specific identifier in an inspection process when such inspection machine is in an environment where it is possible to perform a test through a contactless communication. It is possible for the inspection machine to hold, as a pattern, an identifier included in a response from the contactless card. Accordingly, it becomes not necessary to perform a calculation related to a card ID, as a result of which the efficiency of inspection is increased. Meanwhile, since a randomly generated identifier is used when the contactless card is in use, it becomes possible to protect the cardholder's privacy.

What is more, the use of the contactless card according to the present invention allows the inspection machine to hold in advance test patterns.

The specific identifier generation unit may generate the identifier based on information stored in a read only memory where information stored therein is not rewritable.

The specific identifier generation unit may generate the identifier based on information stored in a non-volatile memory where information stored therein is rewritable. The non-volatile memory is one of an electrically erasable programmable read only memory, a ferroelectric random access memory, a magnetoresistive random access memory, and an ovonic unified memory.

As described above, it is possible for the present invention to provide a contactless card that enables a reader/writer to identify which contactless card such reader/writer is communicating with in a set of card identification processes and that improves the possibility of protecting the cardholder's privacy.

Furthermore, it is also possible to embody the present invention as the following: a method that includes, as its steps, the characteristic units included in the contactless card of the present invention; a program that causes a computer to execute such steps; a storage medium such as a CD-ROM in which such program is stored; and an integrated circuit. It should be also noted that such program can be distributed over a transmission medium such as a communication network.

The disclosure of Japanese Patent Application No. 2004-118807 filed on Apr. 14, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

BEST MODE FOR CARRYING OUT THE INVENTION

The following describes the best mode for carrying out the present invention with reference to the drawings.

Figure 1:
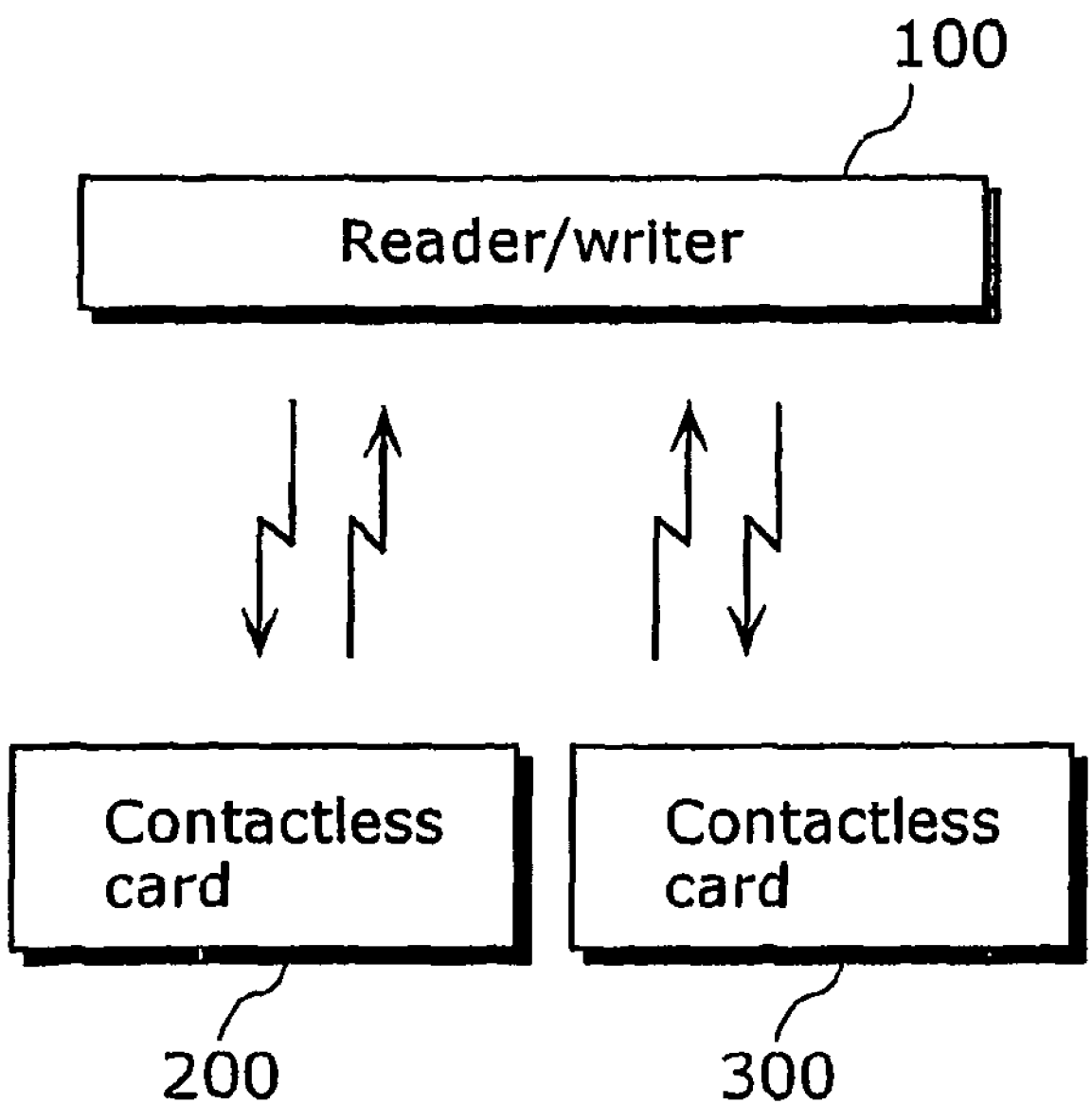
FIG. 1 is a diagram illustrating a situation in which an embodiment is carried out.

A description is given of an embodiment of a contactless card that communicates with a reader/writer in compliance with ISO/IEC14443-3 (Type B, initialization and anticollision scheme). ISO/IEC14443-3 (Type B, initialization and anticollision scheme) is one of the protocols employed, for example, for ticket gates in public transportation facilities and the like. Referring to FIG. 1, suppose the case where contactless card 200 and contactless card 300 functioning as train tickets simultaneously approach reader/writer 100 functioning as a ticket gate.

According to ISO/IEC14443-3 (Type B, initialization and anticollision scheme), contactless cards are identified by the following procedures.

Figure 2:
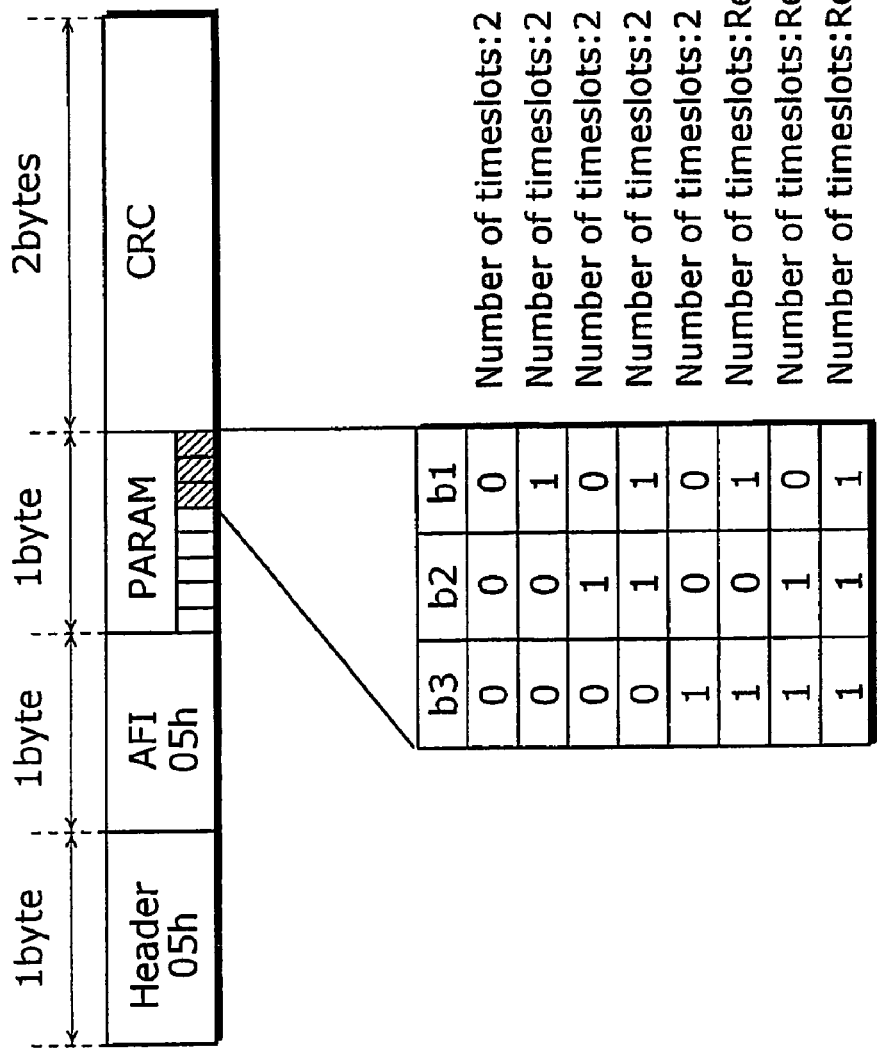
FIG. 2 is a diagram showing a structure of a request command.

First, reader/writer 100, being a ticket gate, sends a request command. The request command is a signal in the format shown in FIG. 2. The number of timeslots (N) is identified in three bits in "PARM", included in the request command, starting from "bit1 ("b1" in FIG. 2)" to "bit3 ("b3" in FIG. 2)". The identified number of timeslots (N) is notified to contactless card 200 and contactless card 300. Each of contactless card 200 and contactless card 300 makes an initial response in one of the timeslots 1 to N.

The following assumes that the number of timeslots (N) is "4". In other words, in response to the request command, each of contactless card 200 and contactless card 300 selects one timeslot from among timeslots 1 to 4, and makes an initial response in the selected timeslot.

Figure 3:
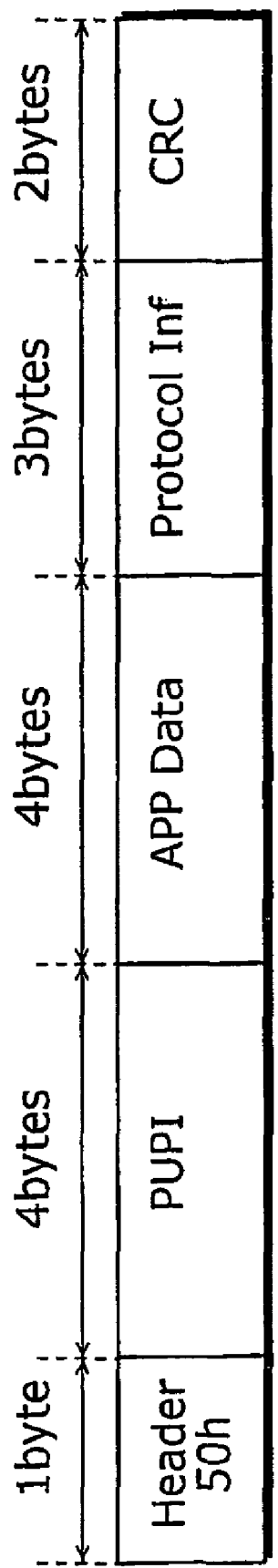
FIG. 3 is a diagram showing a structure of an initial response.

An initial response is a signal in the format shown in FIG. 3. The initial response includes: card ID (PUPI) that identifies the contactless card; APP Data for notifying reader/writer 100 of information about an application included in the contactless card; and Protocol Inf for notifying reader/writer 100 of information about a protocol that is used for carrying out a communication with reader/writer 100. Contactless card 200 and contactless card 300 make an initial response to reader/writer 100 after setting a card ID (PUPI), APP Data and Protocol Inf.

Upon receipt of the initial responses from contactless card 200 and contactless card 300, reader/writer 100 judges whether or not there is a collision of the initial responses with reference to the CRC value or the like of the received initial responses.

Figure 4:
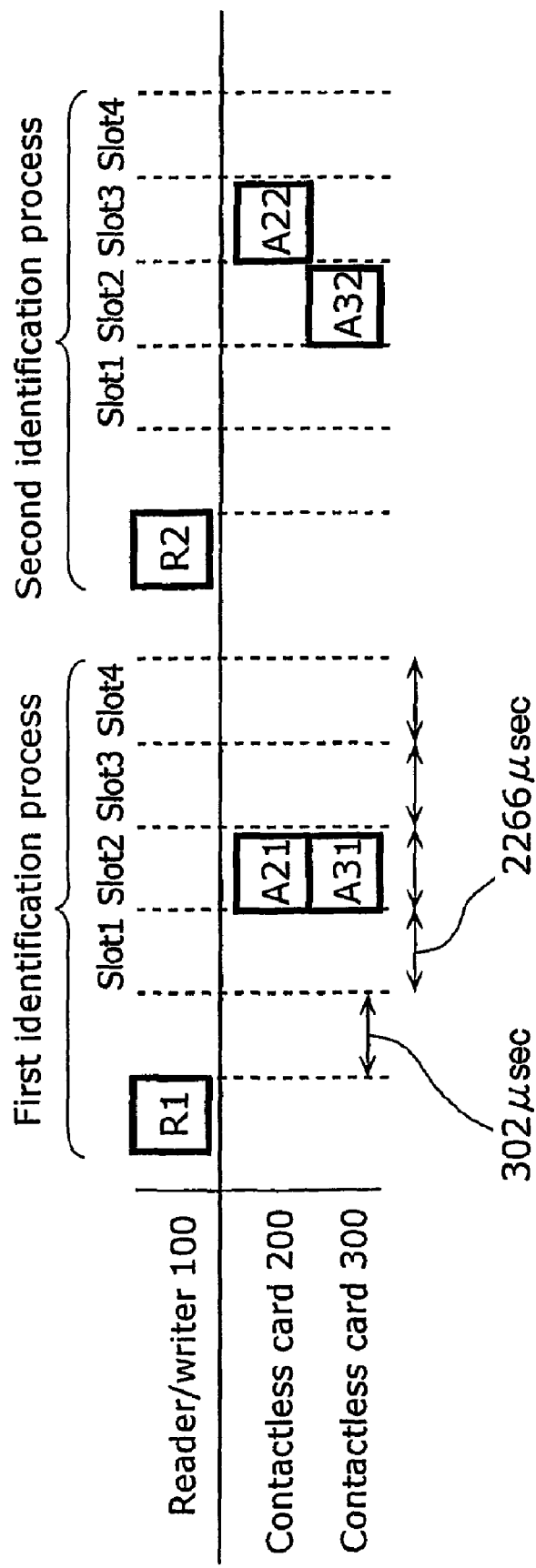
FIG. 4 is a diagram showing a set of card identification processes.

Referring to FIG. 4, in the first card identification process, reader/writer 100 sends request command R1. In response to such request command RI, contactless card 200 and contactless card 300 make their respective initial responses in timeslot 2. In other words, it is in the same timing, timeslot 2, that contactless card 200 makes initial response A21 and contactless card 300 makes an initial response A31. Thus, reader/writer 100 detects that there is a collision of the initial responses. Accordingly, a card identification process is to be performed again.

In the second card identification process, reader/writer 100 sends request command R2. In response to such request command R2, contactless card 200 makes initial response A22 in timeslot 3, whereas contactless card 300 makes initial response A32 in timeslot 2. In other words, contactless card 200 and contactless card 300 make their respective initial responses in different timeslots. In this case, reader/writer 100 detects no occurrence of collision of initial responses. In other words, it is possible for reader/writer 100 to identify contactless card 200 and contactless card 300. Accordingly, the card identification process completes.

In this specification, "a set of card identification processes" refers to processes to be performed from when the reader/writer sends a request command to a contactless card for the first time until when the reader/writer identifies such contactless card. Thus, in an example illustrated in FIG. 4, the first card identification process and the second card identification process make up "a set of card identification processes".

Figure 5:
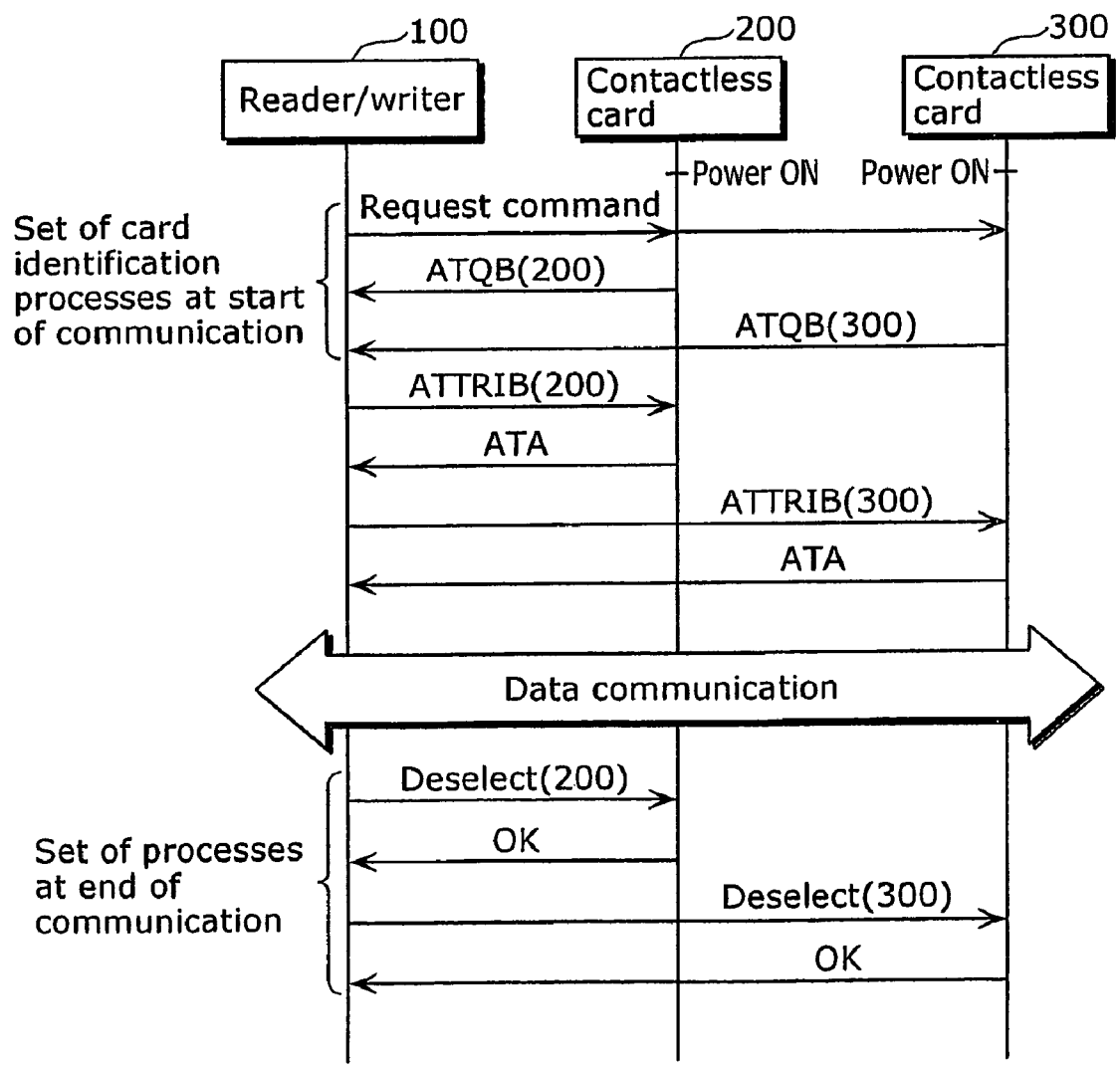
FIG. 5 is a diagram showing a set of card identification processes and communications of actual data.

At the completion of "a set of card identification processes", contactless card 200 and contactless card 300 communicate actual data between them via reader/writer 100. FIG. 5 is a diagram showing "a set of card identification processes" and communications of actual data.

When contactless card 200 and contactless card 300 simultaneously exist within a predetermined range of area from reader/writer 100 and power is supplied to contactless card 200 and contactless card 300 (illustrated as "Power On" in FIG. 5), a set of card identification processes at the start of communication is performed.

At the completion of a set of card identification processes at the start of communication, contactless card 200 and contactless card 300 communicate actual data between them via reader/writer 100.

After the actual data is communicated, a set of processes at the end of communication is performed. In such set of processes, reader/writer 100 sends, to each of the cards, Deselect command that indicates the end of the communication.

Meanwhile, it is also possible to assume the following case as an example, as shown in FIG. 1, where contactless card 200 and contactless card 300 simultaneously approach reader/writer 100: contactless card 200 is a master card that stores the name of the cardholder of contactless card 200, and contactless card 300 approaches reader/writer 100 simultaneously with contactless card 200 with the intention of duplicating the cardholder's name into a memory of contactless card 300. For simplification purposes, the following only describes "a set of card identification processes" to be performed from when reader/writer 100 sends a request command for the first time until when reader/writer 100 identifies contactless card 200.

First Embodiment

Figure 6:
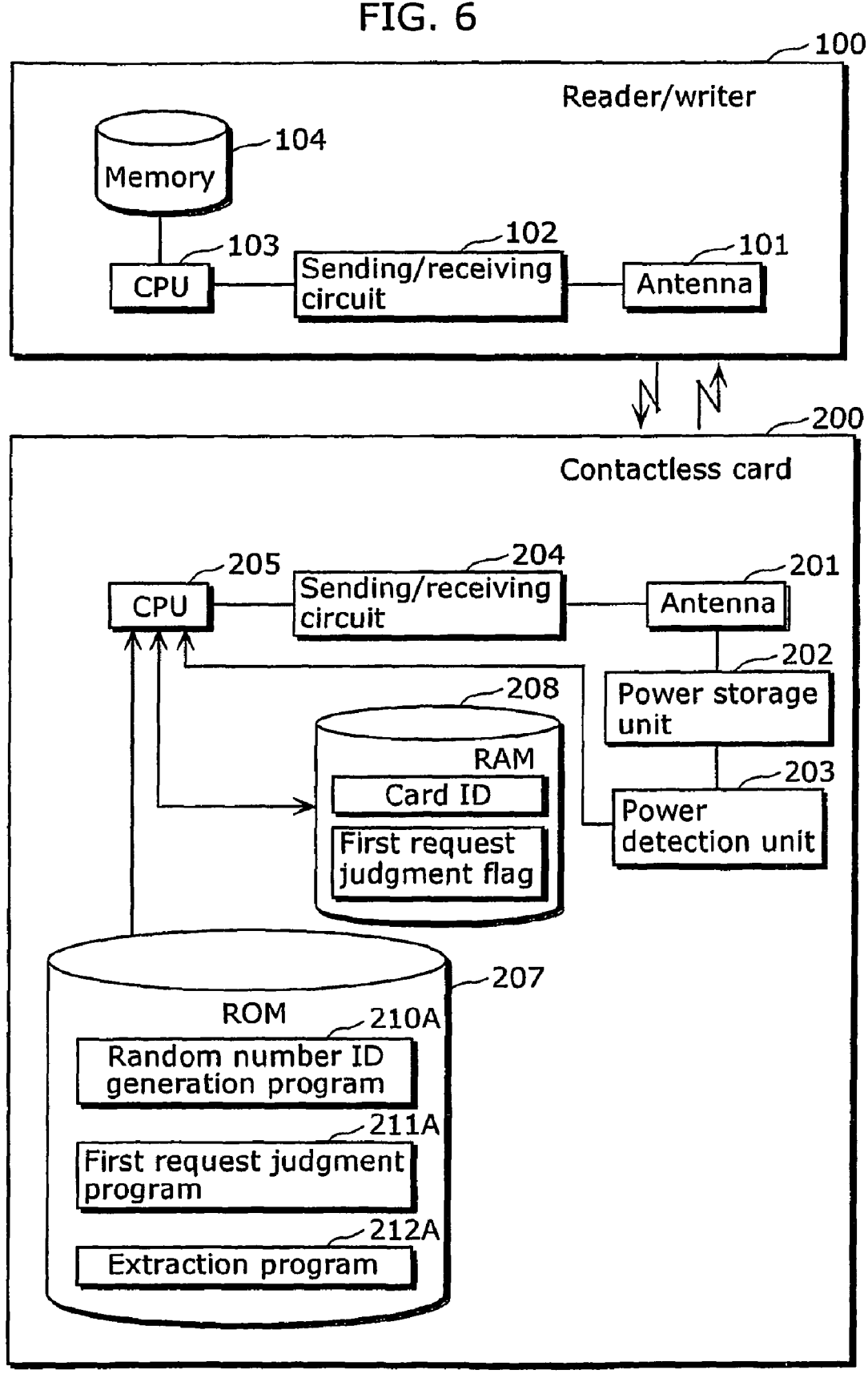
FIG. 6 is a module structure diagram showing structures of a reader/writer and a contactless card according to a first embodiment.

FIG. 6 is a diagram showing structures of reader/writer 100 and contactless card 200.

Reader/writer 100 is made up of antenna 101, sending/receiving circuit 102, central processing unit (CPU) 103, and memory 104. Memory 104 stores a program to be executed by CPU 103 and is used as a storage unit for storing data to be processed at program execution time. Memory 104 may be implemented as, for example, a non-volatile memory that allows the rewriting of information, or may be implemented as a combination of a ROM that does not allow the rewriting of information and that stores a program and data, and a RAM that is used as a temporary work area at program execution time.

Contactless card 200 is made up of antenna 201, power storage unit 202, power detection unit 203, sending/receiving circuit 204, central processing unit (CPU) 205, RAM 208, and ROM 207. Power storage unit 202 stores power, using an induced electromotive force, when contactless card 200 exists within a predetermined range of area from reader/writer 100. Power detection unit 203 detects power that is enough for sending/receiving circuit 204 to communicate with reader/writer 100. In other words, power detection unit 203 detects that power has been supplied. In further other words, power detection unit 203 detects that power storage unit 202 has stored power.

ROM 207 stores a program for processing a command from reader/writer 100 and is used as a storage unit that stores data to be processed at program execution time. The data to be processed includes data to be stored. RAM 208 may be implemented as, for example, a non-volatile memory that allows the rewriting of information.

ROM 207 stores random number ID generation program 210A for generating a card ID using a random number. RAM 208 stores a card ID that is generated by CPU 205 executing random number ID generation program 210A. RAM 208 further stores a first request judgment flag that indicates whether or not a request command received by sending/receiving circuit 204 in "a set of card identification processes" is the first request command.

Furthermore, ROM 207 stores first request judgment program 211A for judging whether or not a request command received by sending/receiving circuit 204 in "a set of card identification processes" is the first request command. ROM 207 further stores extraction program 212A for extracting the card ID stored in RAM 208.

Random number ID generation program 210A, first request judgment program 211A, and extraction program 212A stored in ROM 207 are executed by CPU 205.

Figure 7:
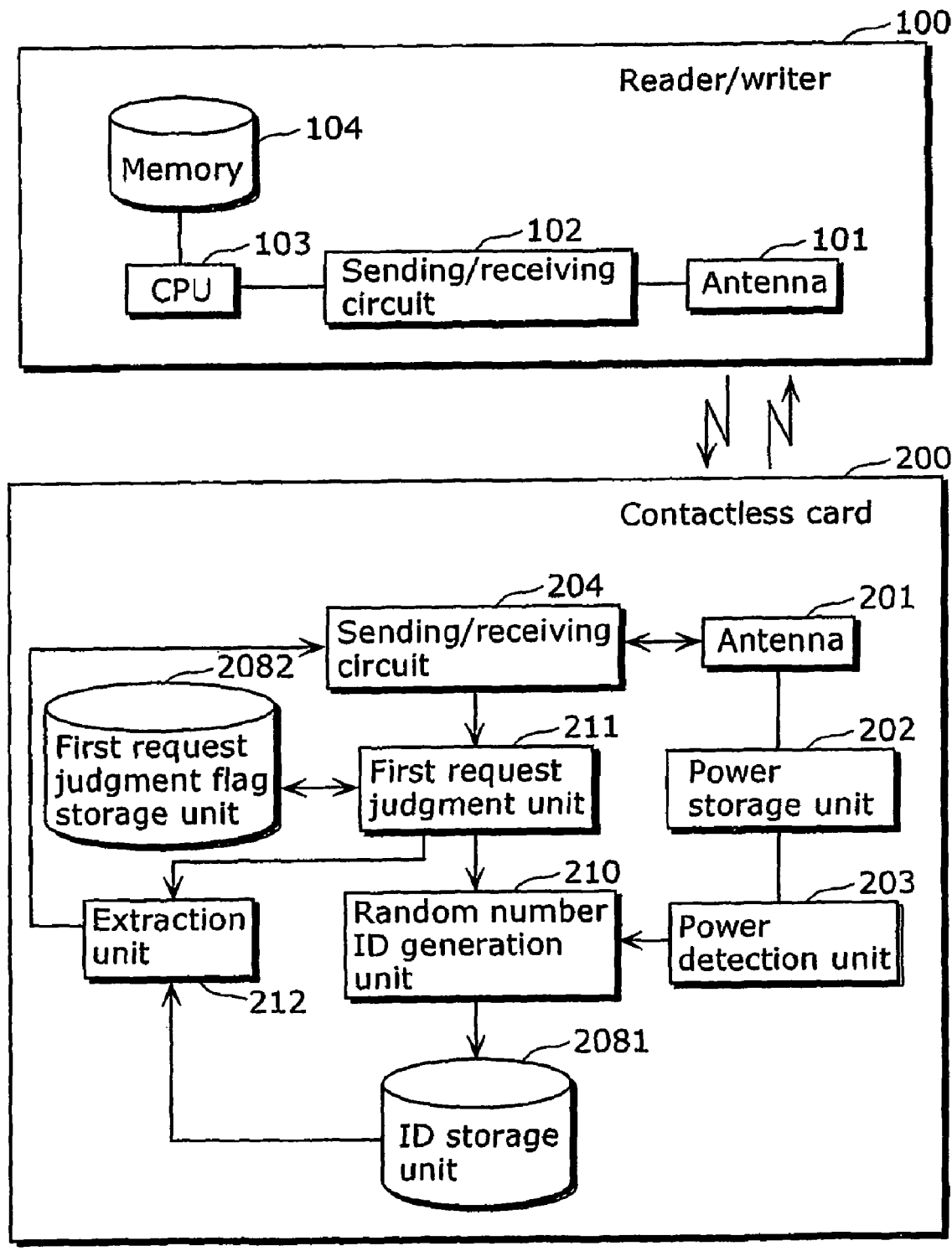
FIG. 7 is a block diagram showing a function of the reader/writer and the contactless card according to the first embodiment.

FIG. 7 is a functional diagram showing an internal structure of contactless card 200 shown in FIG. 6. The following description is provided with reference to FIG. 7. The function of random number ID generation unit 210 is implemented by CPU 205 executing random number ID generation program 210A. The function of first request judgment unit 211 is implemented by CPU 205 executing first request judgment program 211A. The function of extraction unit 212 is implemented by CPU 205 executing extraction program 212A.

One or more, or all of random number ID generation unit 210, first request judgment unit 211, and extraction unit 212 may be implemented as software or as dedicated hardware.

Random number ID generation unit 210 is an example of the identifier determination unit of the contactless card according to the present invention.

ID storage unit 2081 is an area in RAM 208 in which the card ID is stored. First request judgment flag storage unit 2082 is an area in RAM 208 in which the first request judgment flag is stored.

The first request judgment flag is set to the default value, e.g., "0", until power storage unit 202 stores power. The first request judgment flag is set to, e.g., "1" that is different from the default value, when sending/receiving circuit 204 first receives a request command in "a set of card identification processes" after power storage unit 202 stores power. When sending/receiving circuit 204 receives a request command in the case where the first request judgment flag is set to, e.g., "1" that is different from the default value, it means that such request command is the second or a later request command in "a set of card identification processes".

First request judgment unit 211 changes the value of the first request judgment flag.

Figure 8:
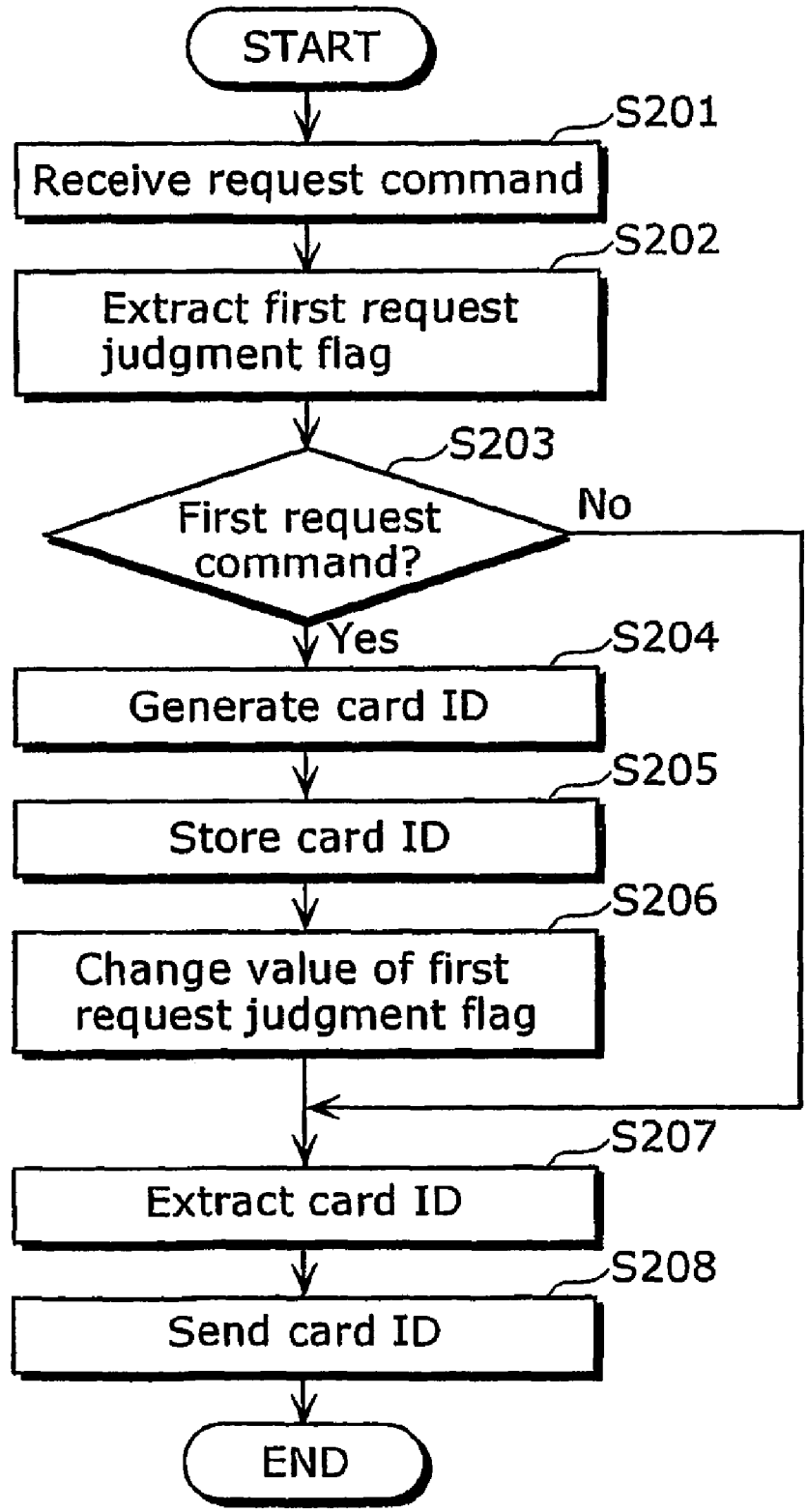
FIG. 8 is a flowchart showing steps performed by the contactless card according to the first embodiment when making an initial response that includes a card ID.

FIG. 8 is a flowchart showing the steps performed by contactless card 200 when making an initial response that includes a card ID.

Here, suppose the case where power detection unit 203 detects that power storage unit 202 has stored power.

When sending/receiving circuit 204 receives a request command from reader/writer 100 (S201), first request judgment unit 211 extracts the first request judgment flag stored in first request judgment flag storage unit 2082 (S202). First request judgment unit 211 judges whether or not the request command received by sending/receiving circuit 204 is the first request command, based on the value of the extracted first request judgment flag (S203). When the value of the first request Judgment flag is the default value, e.g., "0", first request judgment unit 211 judges that the received request command is the first request command. Meanwhile, when the value of the first request judgment flag is different from the default value, e.g., "1", first request judgment unit 211 judges that the received request command is not the first request command. In other words, first request judgment unit 211 judges that the received request command is the second or a later request command.

When first request judgment unit 211 judges that the received request command is the first request command (Yes in S203), random number ID generation unit 210 generates a card ID using a random number (S204). Since a card ID is generated using a random number, it is difficult for a third party to guess the card ID. Furthermore, it is difficult for a third party to guess a next card ID to be generated. Random number ID generation unit 210 may generate a card ID through a calculation that uses a random number or may generate a card ID using a predetermined random number sequence. In other words, random number ID generation unit 210 generates a card ID using a random number so that a third party cannot guess the card ID. Random number ID generation unit 210 stores the generated card ID into ID storage unit 2081 (S205).

First request judgment unit 211 changes the value, being the default value, of the first request judgment flag stored in first request judgment flag storage unit 2802 into a value, e.g., "1", that is different from the default value (S206). Such change is made so that the same card ID is used in a set of card identification processes.

Extraction unit 212 extracts the card ID stored in ID storage unit 2081 (S207). Sending/receiving circuit 204 sends, to reader/writer 100, an initial response that includes the extracted card ID (S208).

Meanwhile, when first request judgment unit 211 judges that the request command received by sending/receiving circuit 204 is not the first request command (No in S203), extraction unit 212 extracts the card ID stored in ID storage unit 2081 (S207). Sending/receiving circuit 204 sends, to reader/writer 100, an initial response that includes the extracted card ID (S208).

In other words, also in the case where the request command received by sending/receiving circuit 204 is the second or a later request command, sending/receiving circuit 204 sends, to reader/writer 100, the card ID that is the same as the card ID to be sent in the case where the received request command is the first request command.

As described above, in the first embodiment, contactless card 200 sends an initial response that includes the same card ID to reader/writer 100. In a set of card identification processes, regardless of whether the received request command is the first request command or the second or a later request command. Accordingly, it becomes possible for reader/writer 100 to communicate with contactless card 200, recognizing that reader/writer 100 is communicating with contactless card 200.

Figure 9:
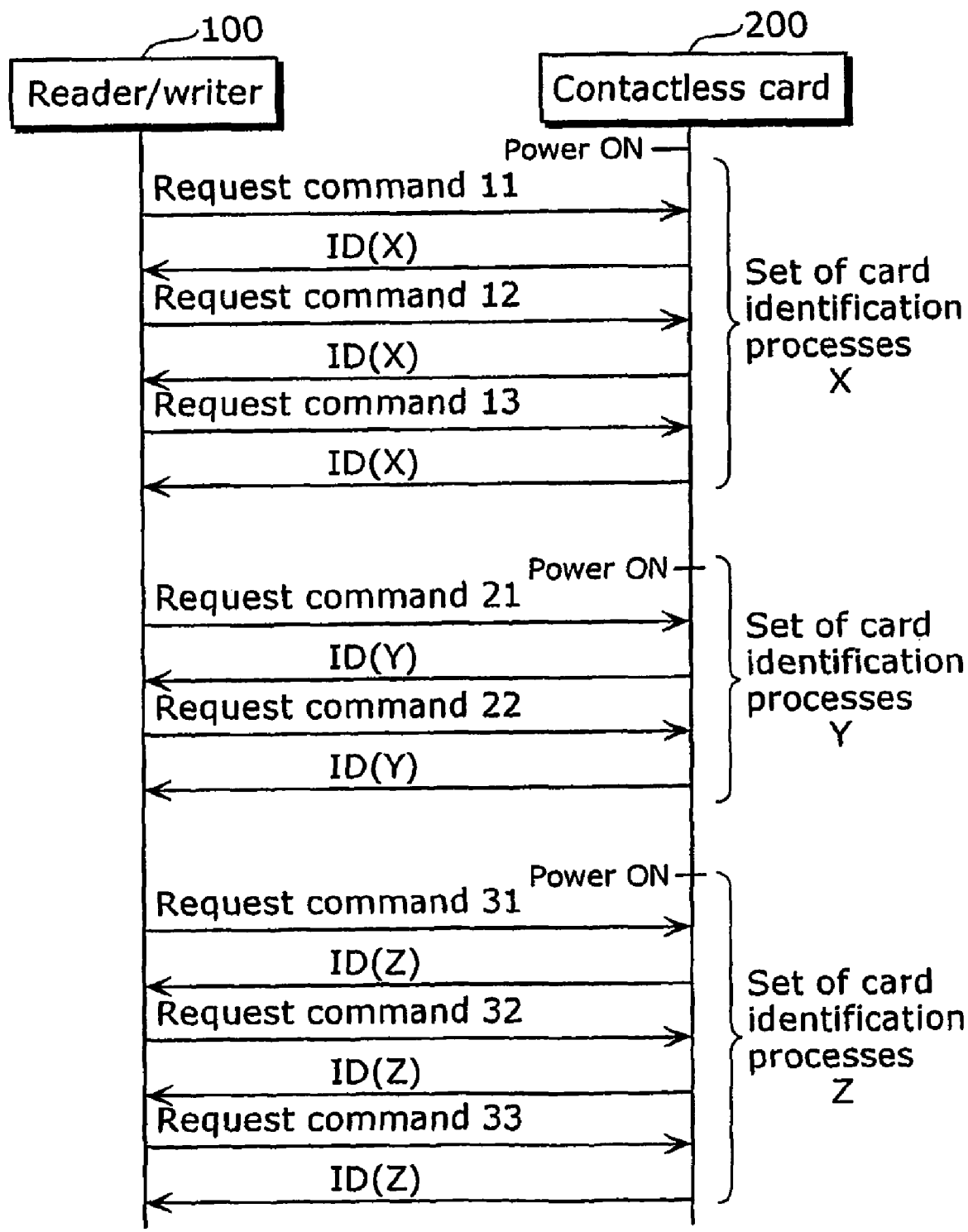
FIG. 9 is a diagram illustrating an effect produced by the first embodiment.

Furthermore, since contactless card 200 generates a card ID using a random number every time power is supplied to contactless card 200, it is difficult for a third party to guess the card ID generated by contactless card 200. FIG. 9 is a diagram showing that (1) contactless card 200 makes initial responses by using a different card ID that is newly generated every time power is supplied and that (2) contactless card 200 sends, to reader/writer 100, initial responses in a set of card identification processes, the initial responses including the same card ID through such set of card identification processes.

As shown in FIG. 9, every time power is supplied and the first request command is received, contactless card 200 makes an initial response using a card ID that is difficult for a third party to guess. As a result, there is a lower possibility of being able to identify the range and time of activities of the cardholder of contactless card 200 even when initial responses are recorded in reader/writer 100 and such records are analyzed. Accordingly, it becomes possible to protect the privacy of the cardholder of contactless card 200.

Figure 10:
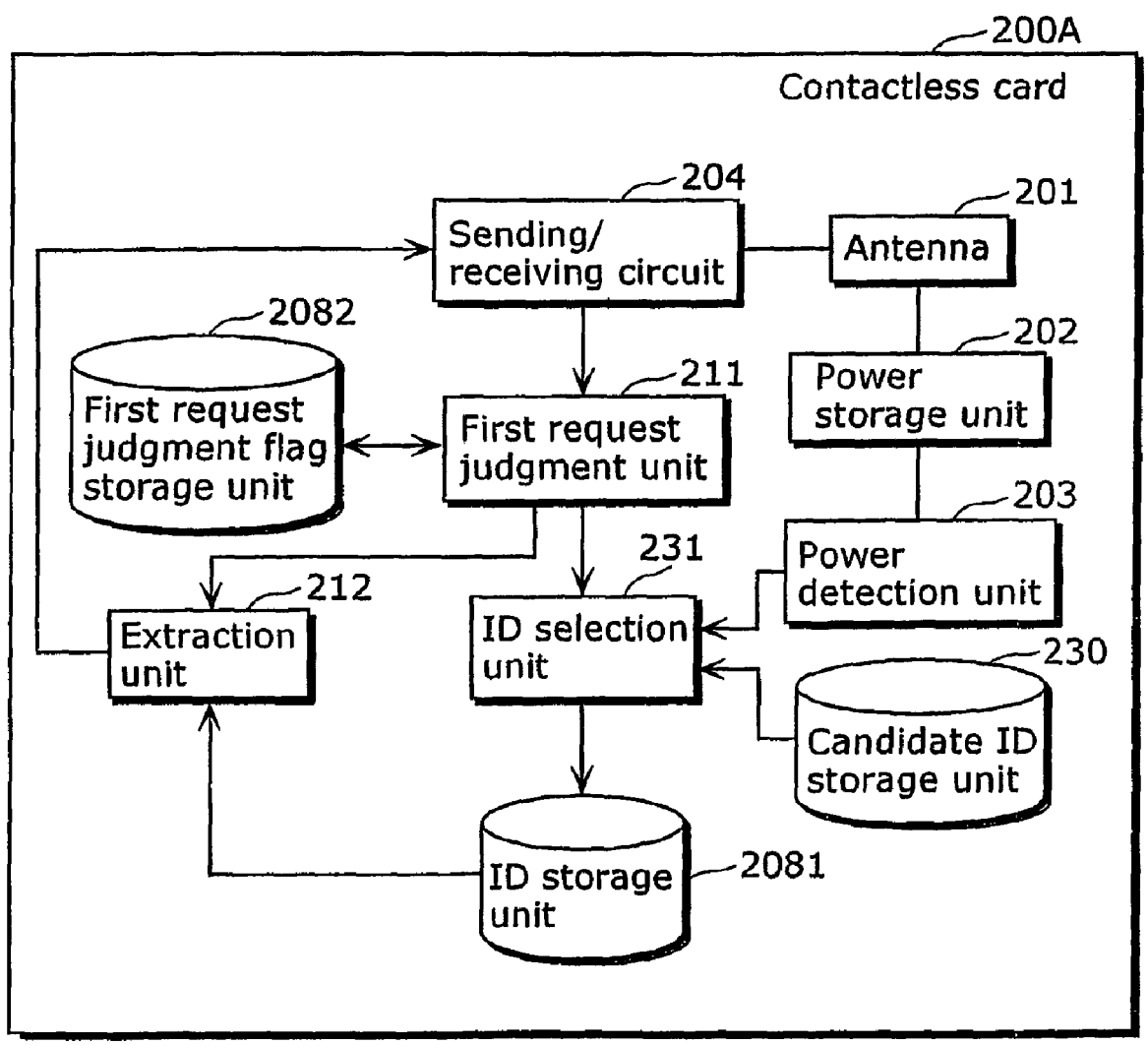
FIG. 10 is a block diagram showing a function of the contactless card according to the first embodiment.

Furthermore, as shown in FIG. 10, contactless card 200 may be replaced by contactless card 200A that includes, instead of random number ID generation unit 210, candidate ID storage unit 230 that stores plural candidate card IDs and ID selection unit 231. When first request Judgment unit 211 judges that the received request command is the first request command, ID selection unit 231 selects and extracts one of the plural candidate card IDs stored in candidate ID storage unit 230, and stores the extracted candidate card ID into ID storage unit 2081. In this case, it is possible to protect the privacy of the cardholder of contactless card 200 as in the case where random number ID generation unit 210 generates a card ID using a random number, provided that the confidentiality of the plural candidate card IDs is sufficiently ensured.

Second Embodiment

Figure 11:
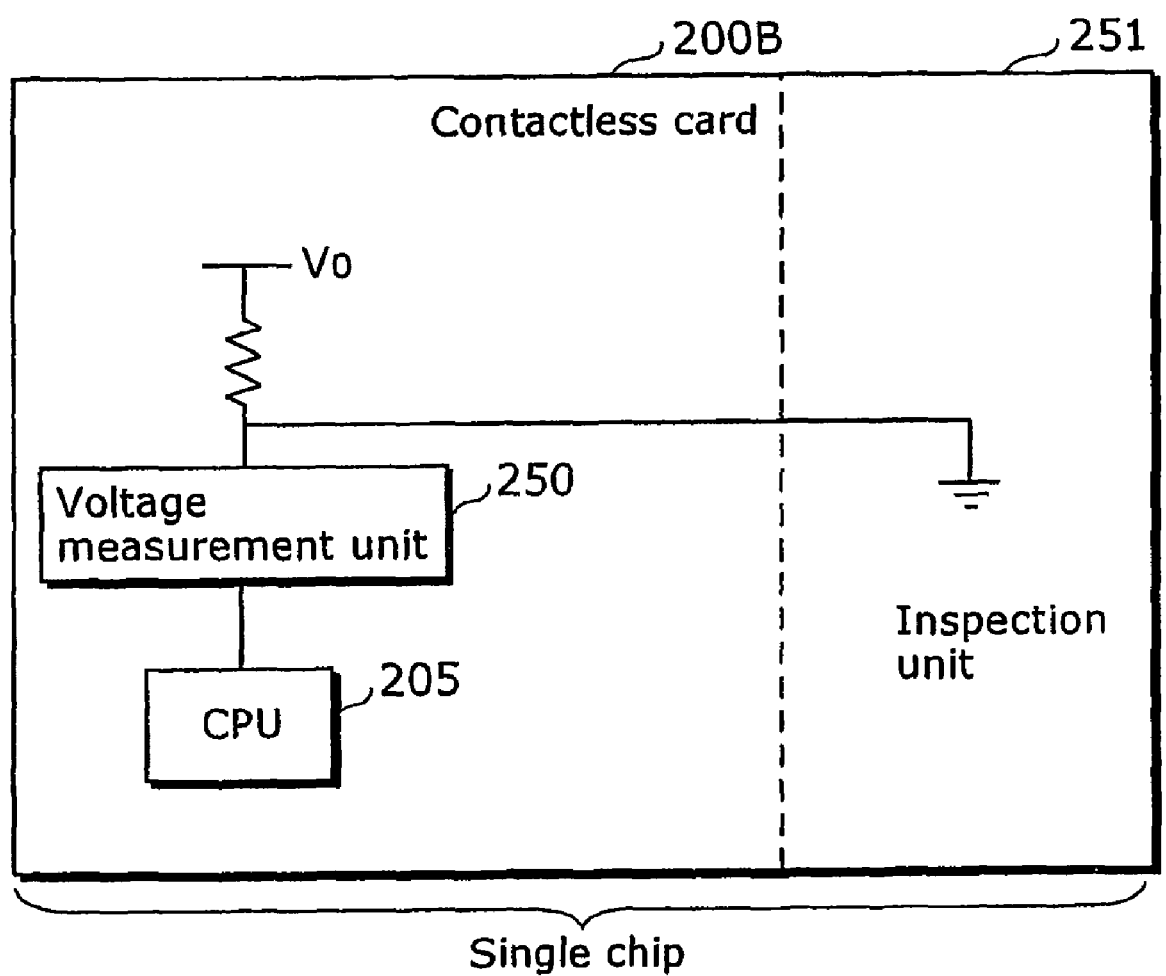
FIG. 11 is a diagram showing a contactless card according to a second embodiment in the manufacturing process.

FIG. 11 is a diagram showing contactless card 200B according to the second embodiment in the manufacturing process. Contactless card 200B is integrated with inspection unit 251 when in the manufacturing process, and is separated from inspection unit 251 immediately before contactless card 200B is completed as a product. In cases such as where a memory of each of plural contactless cards 200B needs to be initialized in a collective manner in the inspection process in the manufacturing, reader/writer 100 is sometimes required to communicate with such plural contactless cards 200B simultaneously. In this case, all of such contactless cards 200B are required to make an initial response that includes a predetermined card ID (hereinafter referred to as "fixed card ID"). Meanwhile, it is not allowed for contactless card 200B completed as a product to make an initial response that includes the fixed card ID for the reason that reader/writer 100 needs to judge which contactless card reader/writer 100 is communicating with and that the cardholder's privacy needs to be protected.

Thus, it is necessary for contactless card 200B to judge whether to generate a fixed card ID or a non-fixed card ID.

In order to do so, contactless card 200B according to the second embodiment has a function of judging whether to generate a fixed card ID or a non-fixed card ID, in addition to the functions of contactless card 200 described in the first embodiment. The following description focuses on such difference between contactless card 200B and contactless card 200. Note that as shown in FIG. 11, contactless card 200B has voltage measurement unit 250. In the second embodiment, since contactless card 200B and inspection unit 251 are integrated to each other when contactless card 200B is in the manufacturing process, there is wiring connecting contactless card 200B and inspection unit 251, and voltage measurement unit 250 obtains a voltage value of 0V in this case. Meanwhile, when contactless card 200B is in use as a product, contactless card 200B and inspection unit 251 are separated from each other. Thus, wiring connecting contactless card 200B and inspection unit 251 is broken, and voltage measurement unit 250 obtains a voltage value of $V_0$ (e.g., 5V).

Figure 12:
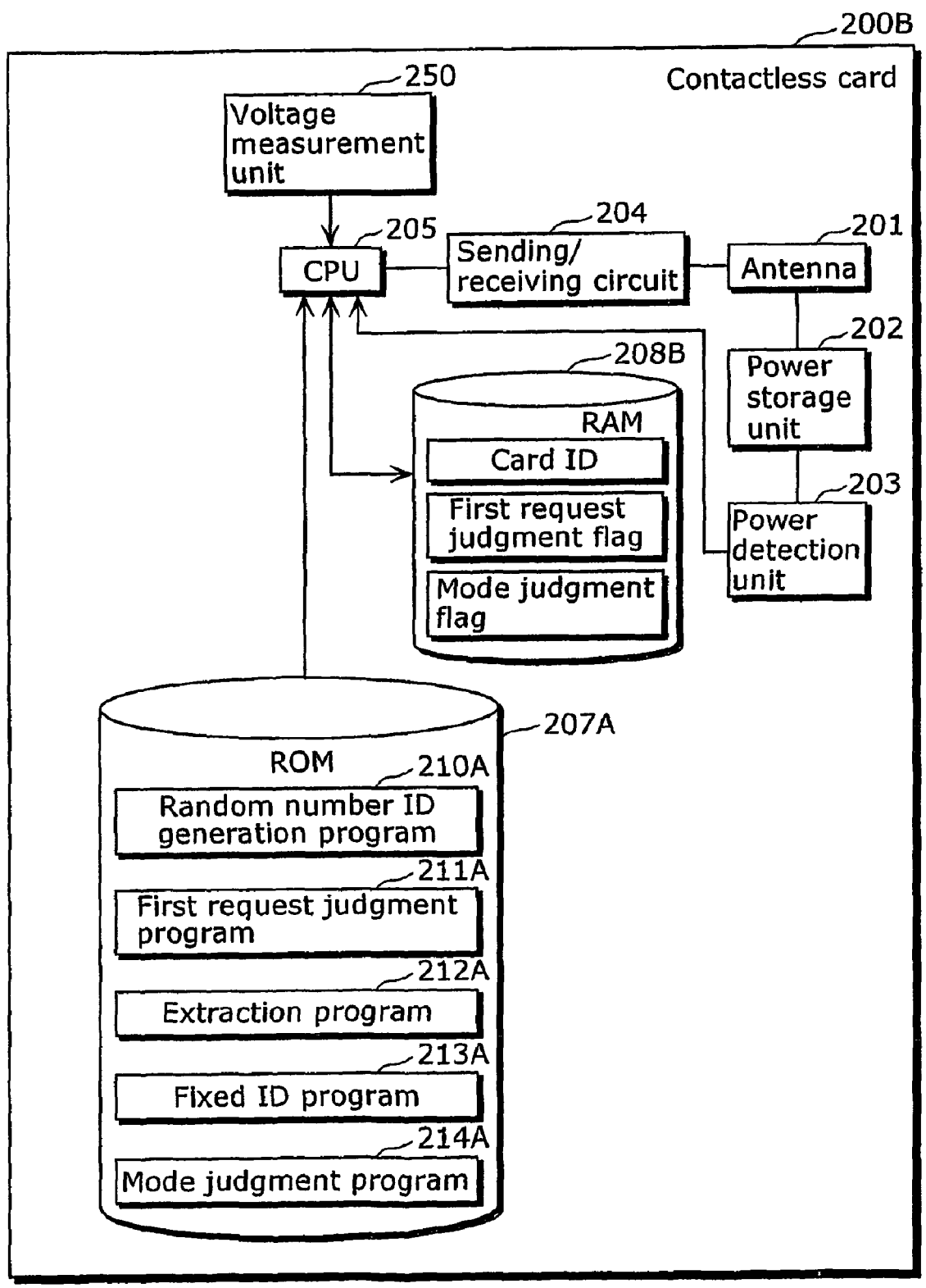
FIG. 12 is a module structure diagram showing the contactless card according to the second embodiment.

FIG. 12 is a diagram showing a structure of contactless card 200B according to the second embodiment. Contactless card 200B is made up of antenna 201, power storage unit 202, power detection unit 203, sending/receiving circuit 204, CPU 205, ROM 207A, and RAM 208B, as in the case of contactless card 200 of the first embodiment, and further includes voltage measurement unit 250.

ROM 207A stores random number ID generation program 210A, first request judgment program 211A, and extraction program 212A. ROM 207A further stores fixed ID generation program 213A and mode judgment program 214A. Each of the programs stored in ROM 207A is executed by CPU 205.

Fixed ID generation program 213A is a program for generating a fixed card ID.

Mode judgment program 214A is a program for judging an operation mode. Here, suppose that there are "inspection mode" and "use mode" as operation modes. "Inspection mode" indicates that contactless card 200B is in the manufacturing process and that the generation of a fixed card ID is required for inspection purposes. "Use mode" indicates that contactless card 200B is in use as a product and that the generation of a card ID using a random number is required for the purpose of identifying a contactless card being communicated with and for the purpose of protecting the cardholder's privacy. One of "inspection mode" and "use mode" is selected based on a voltage value measured by voltage measurement unit 250.

RAM 208A stores a card ID that is generated by CPU 205 by executing random number ID generation program 210A or fixed ID generation program 213A. RAM 208A further stores a first request judgment flag and a mode judgment flag that indicates whether a card ID should be generated in "inspection mode" or in "use mode".

Figure 13:
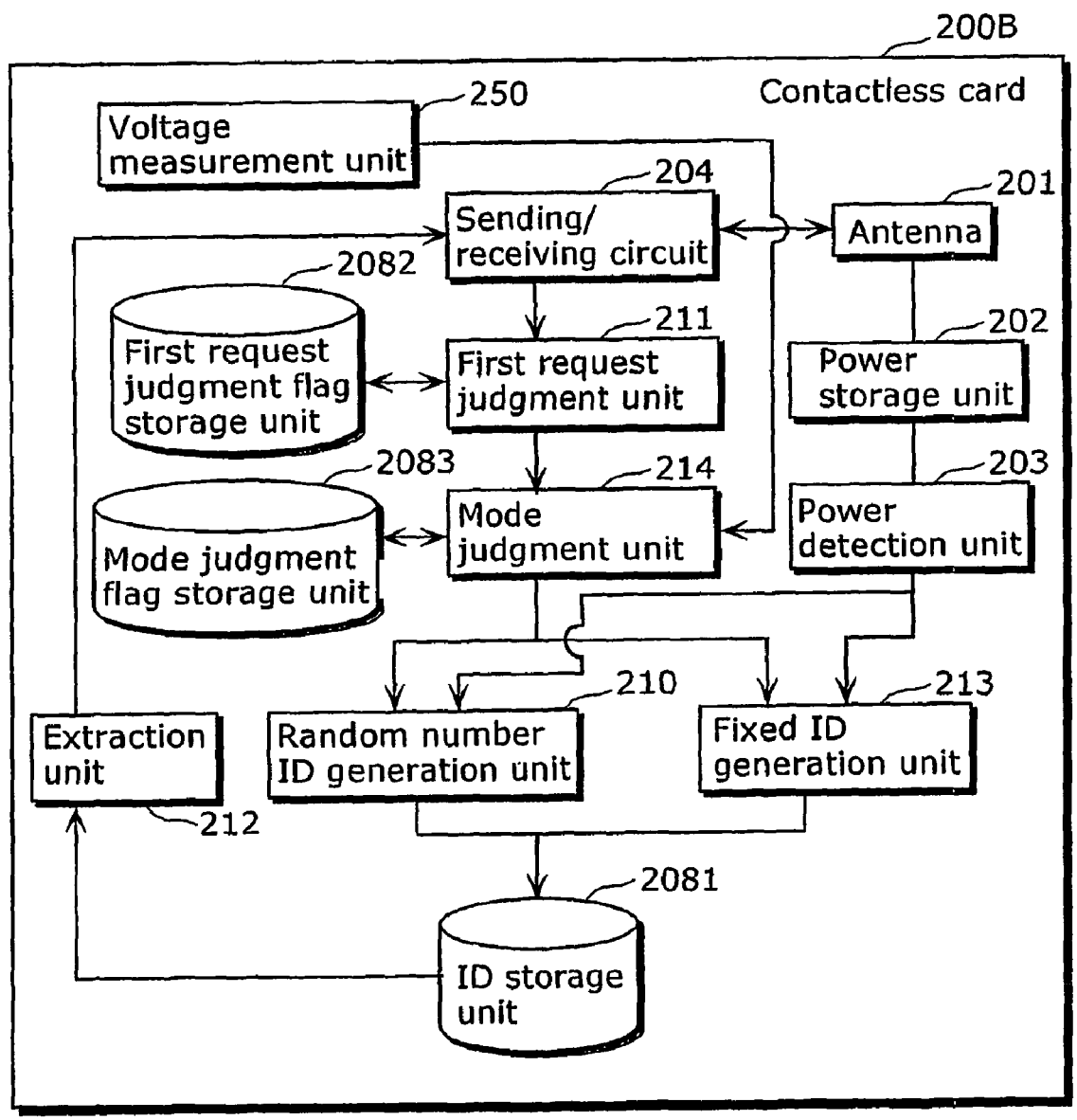
FIG. 13 is a block diagram showing a function of the contactless card according to the second embodiment.

FIG. 13 is a functional diagram showing an internal structure of contactless card 200B shown in FIG. 12. The following description is provided with reference to FIG. 13. The function of fixed ID generation unit 213 is implemented by CPU 205 executing fixed ID generation program 213A. The function of mode judgment unit 214 is implemented by CPU 205 executing mode judgment program 214A.

One or both of fixed ID generation unit 213 and mode judgment unit 214 may be implemented as software or as dedicated hardware.

Random number ID generation unit 210 and fixed ID generation unit 213 are an example of the identifier determination units of the contactless card according to the present invention. Furthermore, random number ID generation unit 210 is also an example of the random identifier generation unit of the contactless card according to the present invention, and fixed ID generation unit 213 is also an example of the specific identifier generation unit of the contactless card according to the present invention.

Fixed ID generation unit 213 generates a fixed card ID based on, for example, information stored in ROM 207A. In the case where contactless card 200B has a ROM or a non-volatile memory other than ROM 207A, fixed ID generation unit 213 may generate a fixed card ID based on information stored in such ROM or non-volatile memory other than ROM 207A. An example of the information is an identifier that is assigned to contactless card 200B at the time of manufacturing to identify contactless card 200B. The non-volatile memory is an Electrically Erasable Programmable Read Only Memory (EEPROM), a Ferroelectric Random Access Memory (FeRAM), a Magnetoresistive Random Access Memory (MRAM), an Ovonic Unified memory (OUM), or the like.

Mode judgment flag storage unit 2083 is an area in RAM 208A in which the mode judgment flag is stored.

The mode judgment flag is set to the default value, e.g., "0", when contactless card 200B is in the manufacturing process. Meanwhile, when contactless card 200B is in use as a product, the mode judgment flag is set to a value different from the default value, e.g., "1".

Mode judgment unit 214 changes the value of the mode judgment flag based on the voltage value measured by voltage measurement unit 250.

Figure 14:
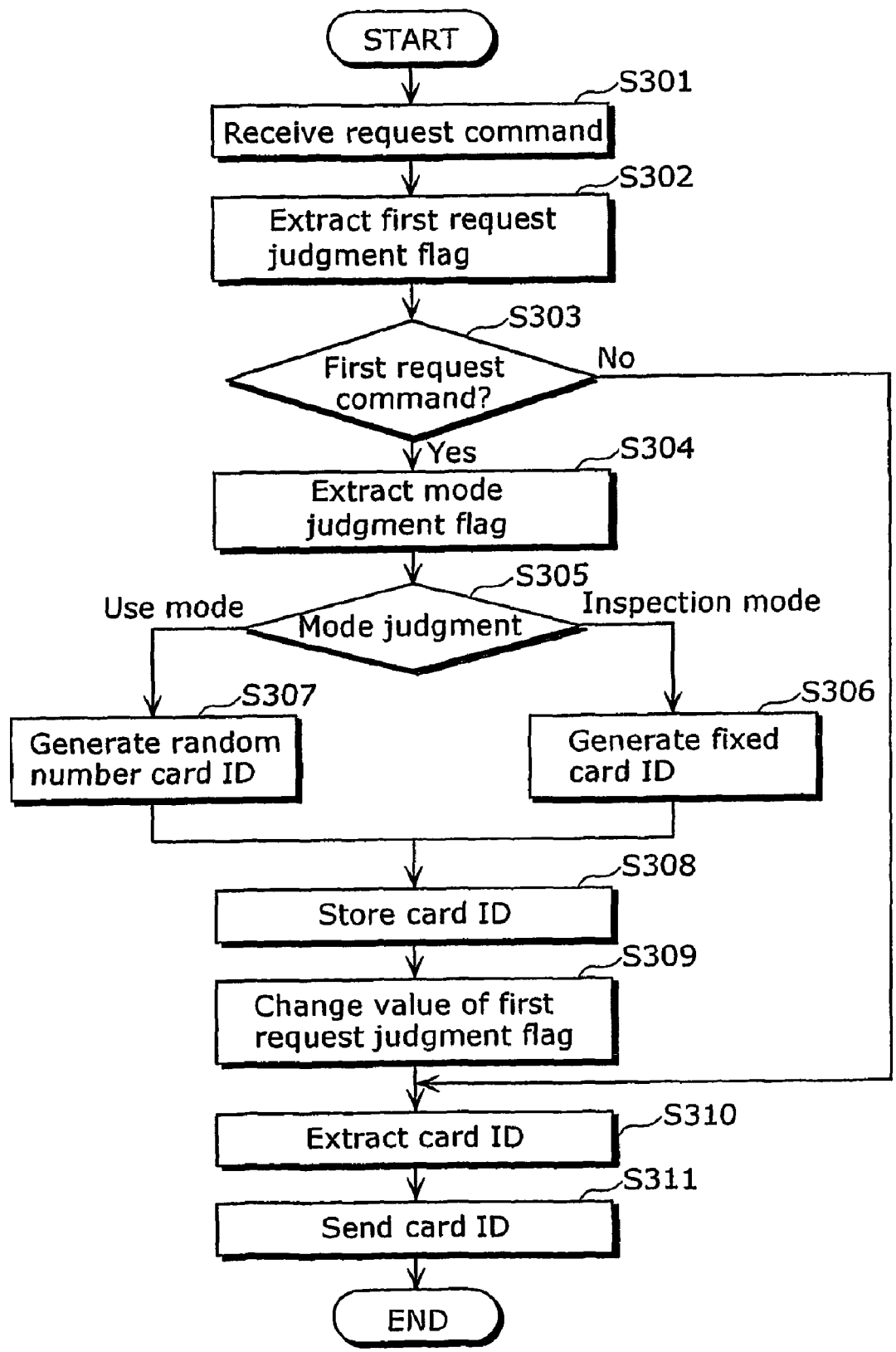
FIG. 14 is a flowchart showing steps performed by the contactless card according to the second embodiment when making an initial response that includes a card ID.

FIG. 14 is a flowchart showing the steps performed by contactless card 200B when making an initial response that includes a card ID.

Here, suppose the case where power detection unit 203 detects that power storage unit 202 has stored power.

When sending/receiving circuit 204 receives a request command from reader/writer 100 (S301), first request judgment unit 211 extracts the first request judgment flag stored in first request judgment flag storage unit 2082 (S302). First request judgment unit 211 judges whether or not the request command received by sending/receiving circuit 204 is the first request command, based on the value of the extracted first request judgment flag (S303).

When first request judgment unit 211 judges that the received request command is the first request command (Yes in S303), mode judgment unit 214 extracts the mode judgment flag stored in mode judgment flag storage unit 2083 (S304). Mode judgment unit 214 judges whether to generate a card ID in "inspection mode" or in "use mode", based on the value of the extracted mode judgment flag (S305).

Mode judgment unit 214 judges that a card ID should be generated in "inspection mode" when the value of the mode judgment flag is the default value, e.g., "0" ("inspection mode" in S305). Meanwhile, mode judgment unit 214 judges that a card ID should be generated in "use mode" when the value of the mode judgment flag is different from the default value, e.g., "1" ("Use mode" in S305).

When mode judgment unit 214 judges that a card ID should be generated in "inspection mode" ("inspection mode" in S305), fixed ID generation unit 213 generates a fixed card ID that is previously determined (S306), and then stores the generated card ID into ID storage unit 2081 (S308). Meanwhile, when mode judgment unit 214 judges that a card ID should be generated in "use mode" ("Use mode" in S305), random number ID generation unit 210 generates a card ID, using a random number (S307), and then stores the generated card ID into ID storage unit 2081 (S308).

First request judgment unit 211 changes the value, being the default value, of the first request judgment flag stored in first request judgment flag storage unit 2802 into a value that is different from the default value, e.g., "1" (S309).

Extraction unit 212 extracts the card ID stored in ID storage unit 2081 (S310). Sending/receiving circuit 204 sends, to reader/writer 100, an initial response that includes the extracted card ID (S311).

Meanwhile, when first request judgment unit 211 judges that the request command received by sending/receiving circuit 204 is not the first request command (No in S303), extraction unit 212 extracts the card ID stored in ID storage unit 2081 (S310). Sending/receiving circuit 204 sends, to reader/writer 100, an initial response that includes the extracted card ID (5311).

In other words, also in the case where the request command received by sending/receiving circuit 204 is the second or a later request command, sending/receiving circuit 204 sends, to reader/writer 100, the card ID that is the same as the card ID to be sent in the case where the received request command is the first request command.

As described above, in the second embodiment, contactless card 200B judges whether an operation mode is "inspection mode" or "use mode", and generates a card ID based on such judgment. Accordingly, when contactless cards 200B are in the manufacturing process, it becomes possible for reader/writer 100 to communicate with each of plural contactless cards 200B in a collective manner, using a fixed card ID. Meanwhile, when contactless card 200B is in use, contactless card 200B communicates with reader/writer 100, using a card ID that is difficult for a third party to guess. This makes it possible to protect the privacy of the cardholder of contactless card 200B.

In "inspection mode", it is possible for an inspection machine to communicate with plural contactless cards 200B, via reader/writer 100, using a fixed card ID, so as to inspect such plurality of contactless cards 200B. By holding a fixed card ID, it becomes not necessary for the inspection machine to perform a calculation related to a card ID, as a result of which the efficiency of inspection is increased.

Note that operation modes are not limited to "inspection mode" and "use mode", which may therefore be a mode in which memory initialization is possible and a mode in which memory initialization is not possible. In either case, contactless card 200B generates a card ID depending on the operation mode.

For example, in the case where the cardholder does not care about his/her privacy, contactless card 200B generates a fixed card ID in a mode for generating a fixed card ID. In this case, the use of a fixed card ID allows the cardholder to receive a special service. In contrast, in the case where the cardholder cares about his/her privacy, contactless card 200B generates a card ID in a mode for generating a card ID using a random number. In this case, the use of such card ID results in improved convenience of the cardholder.

A fixed card ID may be stored in a ROM that does not allow the rewriting of information. In this case, the above inspection machine or the like may previously hold test patterns.

Furthermore, a fixed card ID may be stored in a non-volatile memory that allows the rewriting of information. In this case, it is possible to rewrite a fixed card ID. An example of the non-volatile memory is an EEPROM, a FeRAM, an MRAM, an OUM, or the like.

Note that fixed ID generation unit 213 may generate a card ID by sequentially using a card ID included in a known card ID sequence, rather than generating a fixed card ID. In this case, it is possible to achieve the same effect as is produced through the use of a fixed card ID, by allowing reader/writer 100 to know in advance a card ID to be sent thereto from the above card ID sequence and from the card ID that is used when the use of the card ID sequence starts.

Figure 15:
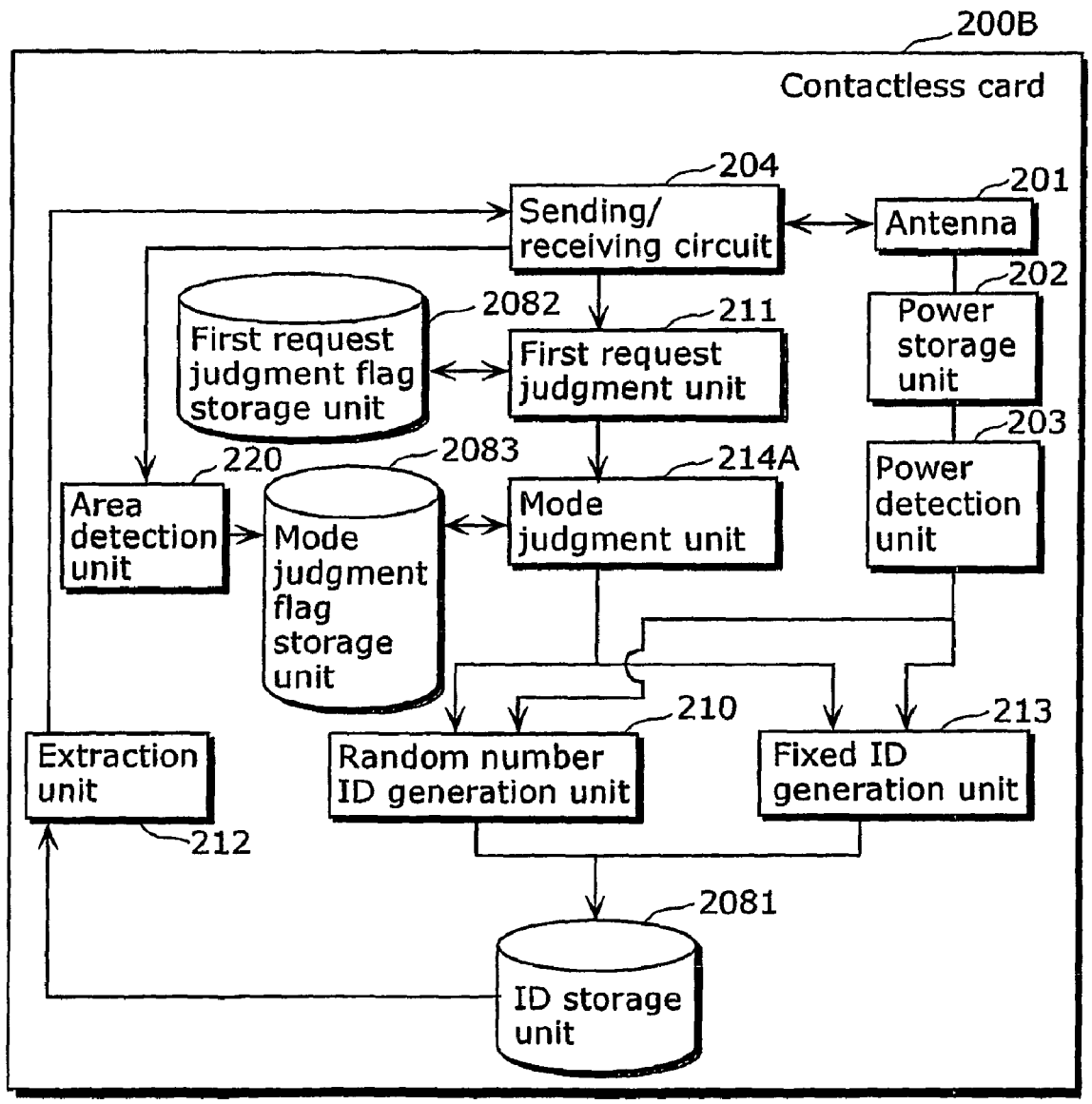
FIG. 15 is a block diagram showing a function of the contactless card according to the second embodiment.

Moreover, as shown in FIG. 15, contactless card 200B may be replaced by contactless card 200C that further includes area detection unit 220. Area detection unit 220 detects that contactless card 200C exists in a specific area. Area detection unit 220 changes the value of the mode judgment flag stored in mode judgment flag storage unit 2083 based on the result of the detection.

For example, suppose the case where the cardholder of contactless card 200C is an employee of a certain company. When such employee enters a building owned by the company with contactless card 200C on him/her, area detection unit 220 detects that contactless card 200C exists in the building. In this case, area detection unit 220 changes the value of the mode judgment flag into a value that indicates that a fixed card ID should be generated. Meanwhile, when detecting that contactless card 200C does not exist in the building, area detection unit 220 changes the value of the mode judgment flag into a value that indicates that a card ID should be generated using a random value.

Accordingly, it becomes possible to supervise the activities of employees when they are inside a company building, with their privacies being protected when they are outside the company building.

Figure 16:
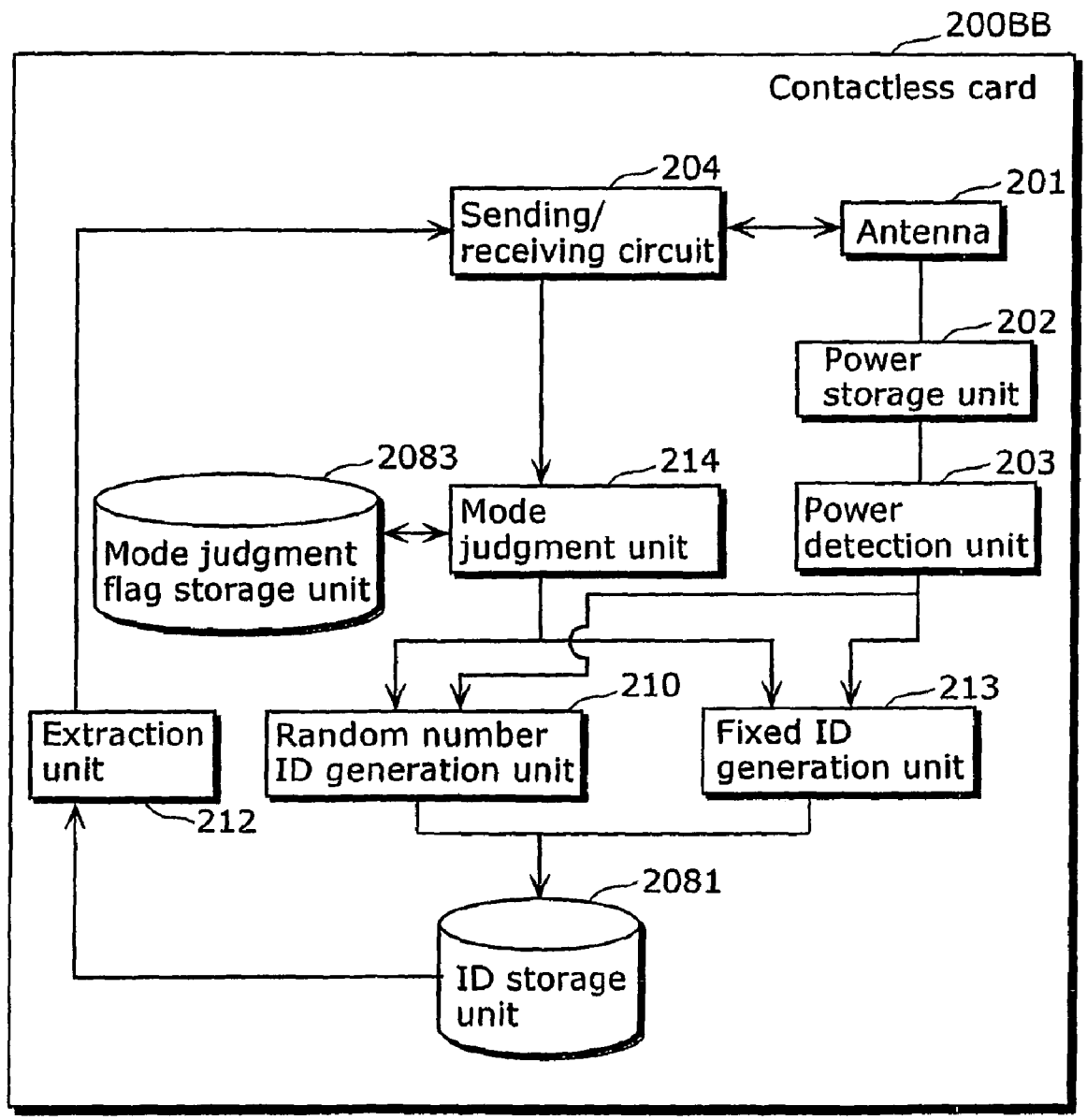
FIG. 16 is a block diagram showing a function of the contactless card according to the second embodiment.
Figure 17:
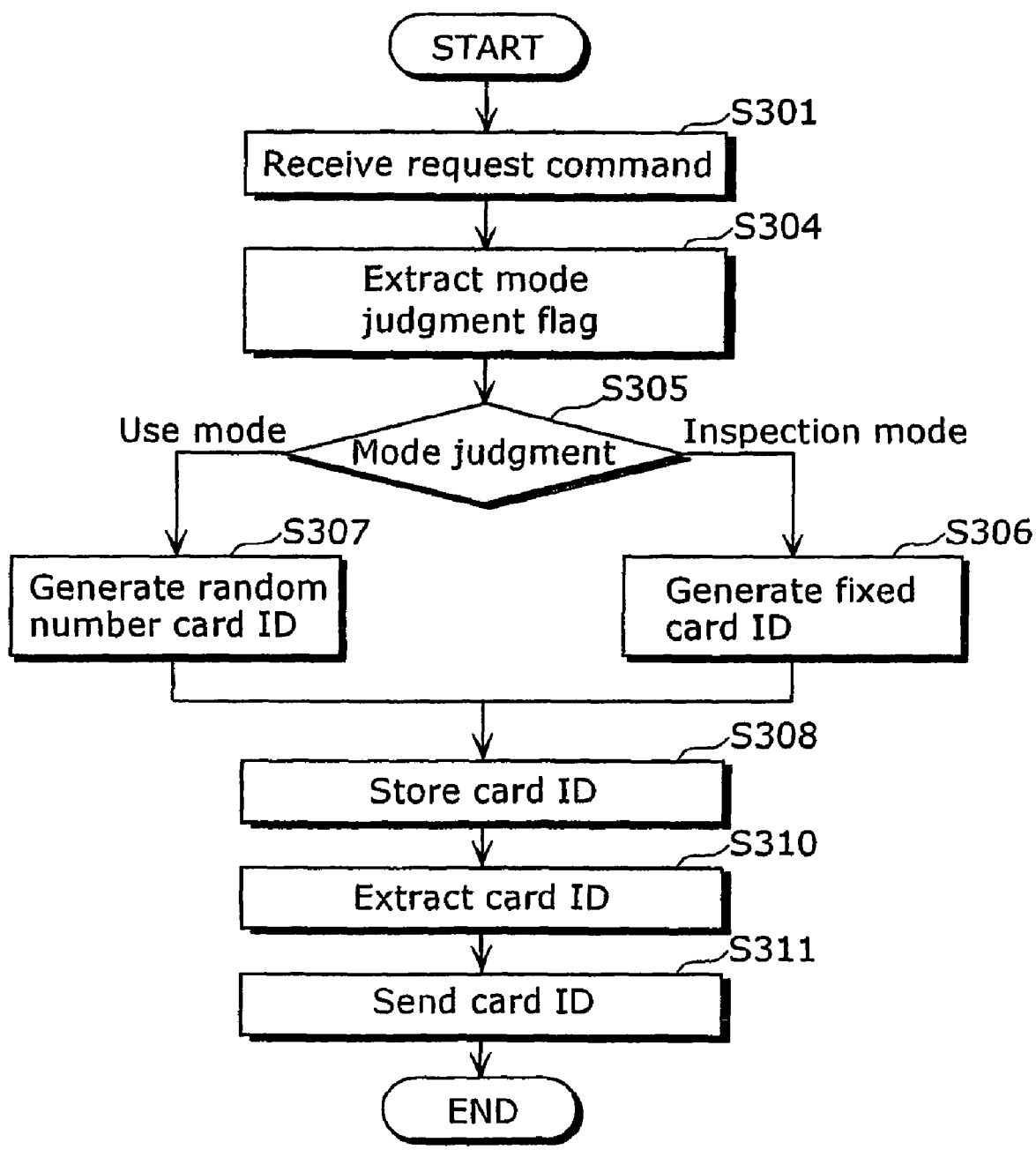
FIG. 17 is a flowchart showing steps performed by the contactless card according to the second embodiment when making an initial response that includes a card ID.

Furthermore, as shown in FIG. 16, contactless card 200B may be replaced by contactless card 200BB that is a result of deleting first request judgment unit 211 and first request judgment flag storage unit 2082 from contactless card 200B. In this case, as shown in FIG. 17, the operation of contactless card 200BB is a result of deleting, from the steps shown in FIG. 14, the following steps performed by first request judgment unit 211: a step of extracting the first request judgment flag (S302); a step of judging whether or not a request command is the first request command (S303); and a step of changing the value of the first request judgment flag (S309).

Contactless card 200BB is capable of producing the effect that is produced by contactless card 200B by generating a card ID depending on the operation mode.

Third Embodiment

Figure 18:
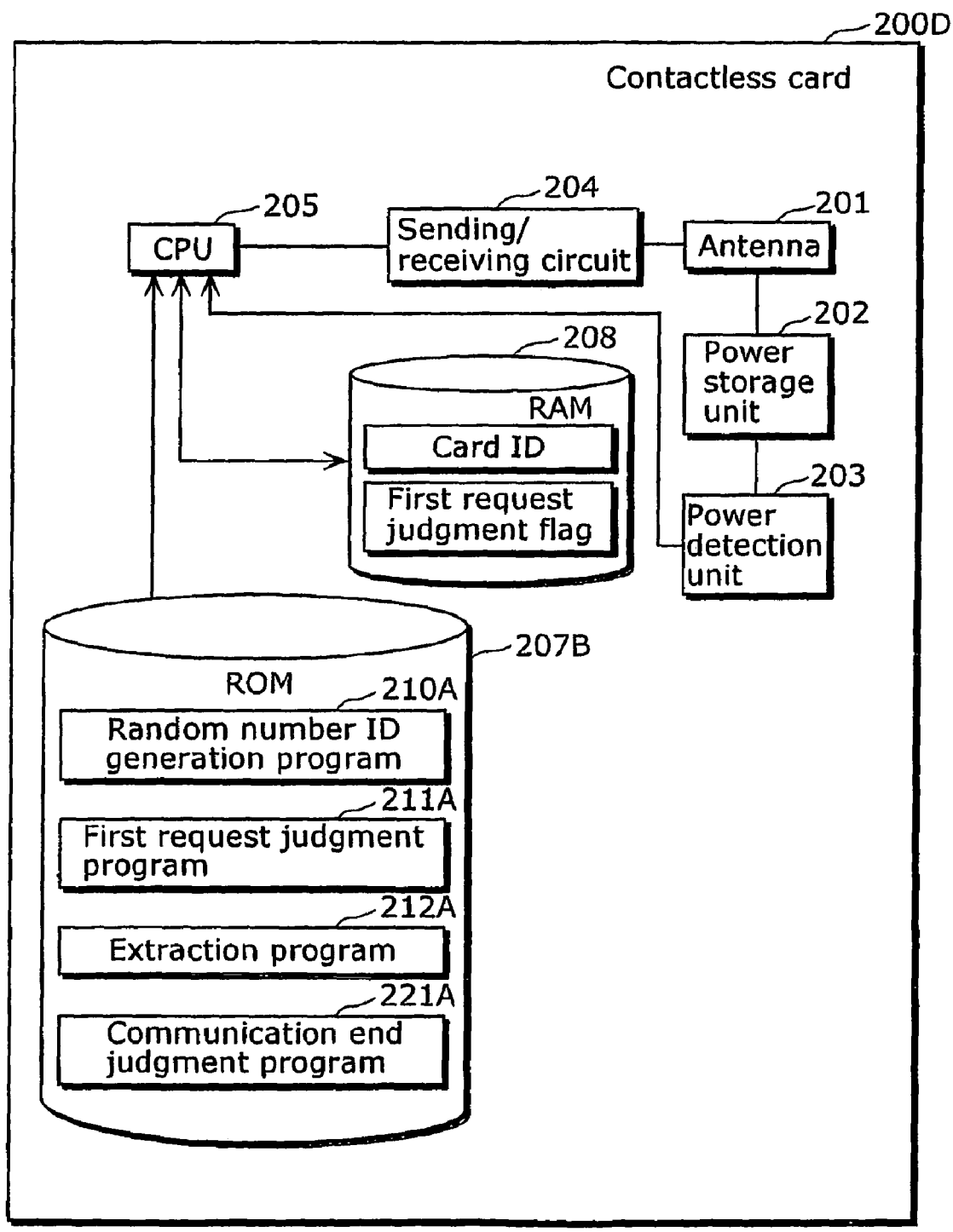
FIG. 18 is a module structure diagram showing a contactless card according to a third embodiment.

FIG. 18 is a diagram showing a structure of contactless card. 200D according to the third embodiment.

Contactless card 200D is made up of antenna 201, power storage unit 202, power detection unit 203, sending/receiving circuit 204, CPU 205, ROM 207B and RAM 208, as in the case of contactless card 200 of the first embodiment.

ROM 207B stores random number ID generation program 210A, first request judgment program 211A, and extraction program 212A. ROM 207B further stores communication end judgment program 221A. Each of the programs stored in ROM 207B is executed by CPU 205.

Communication end judgment program 221A is a program for monitoring whether or not a communication between sending/receiving circuit 204 and reader/writer 100 has ended.

Figure 19:
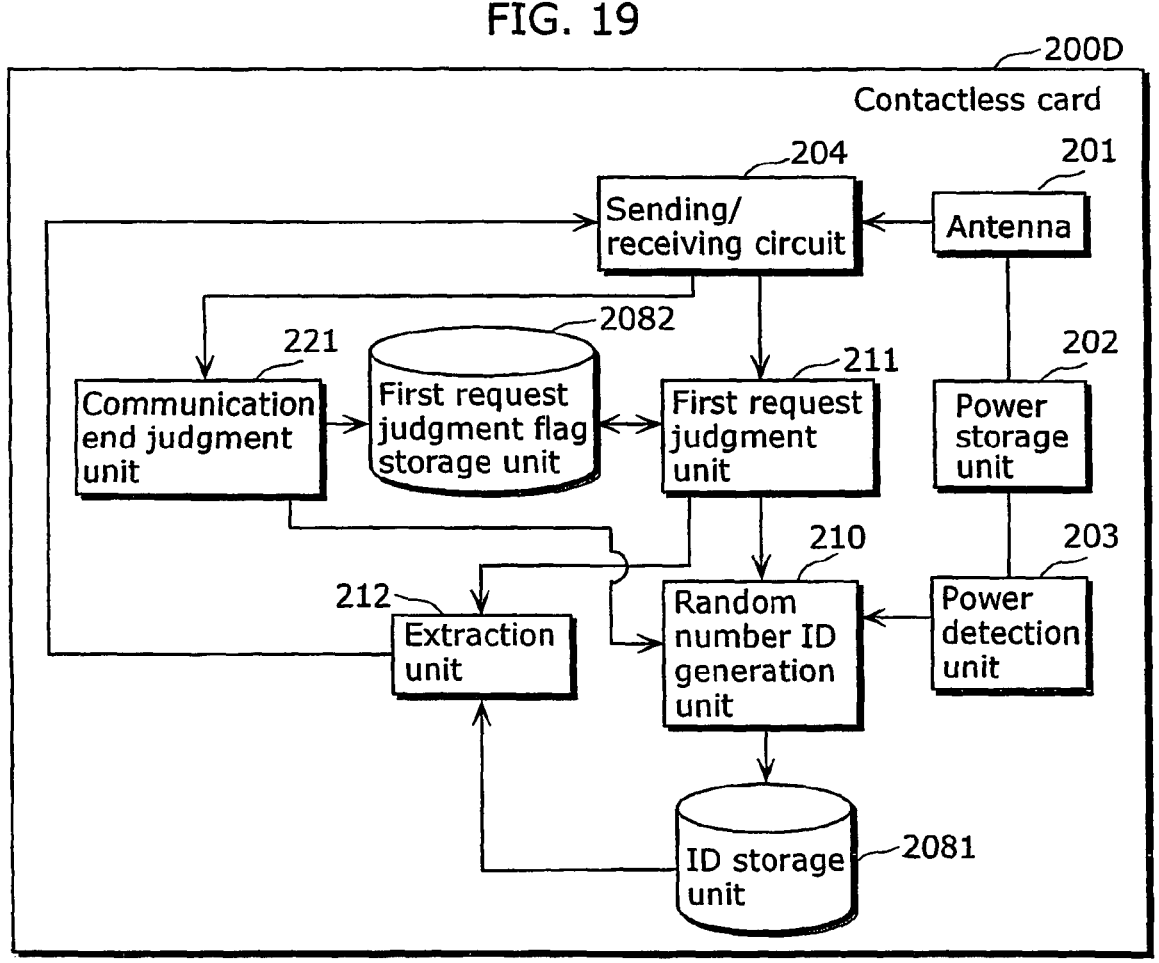
FIG. 19 is a block diagram showing a function of the contactless card according to the third embodiment.

FIG. 19 is a functional diagram showing an internal structure of contactless card 200D shown in FIG. 18. The following description is provided with reference to FIG. 19. The function of communication end judgment unit 221 is implemented by CPU 205 executing communication end judgment program 221A.

Communication end judgment unit 221 may be implemented as software or as dedicated hardware.

The following describes an operation of communication end judgment unit 221.

Communication end judgment unit 221 monitors whether or not a communication between sending/receiving circuit 204 and reader/writer 100 has ended. When judging that the communication between sending/receiving circuit 204 and reader/writer 100 has ended, communication end judgment unit 221 changes the value of the first request judgment flag stored in first request judgment flag storage unit 2082 into the default value, e.g., "0". When judging that the communication between sending/receiving circuit 204 and reader/writer 100 has not ended yet, communication end judgment unit 221 does not change the value of the first request judgment flag.

As is obvious from the descriptions of the first embodiment and second embodiment, a card ID is newly generated when the value of the first request judgment flag is the default value. Thus, contactless card 200D newly generates a card ID after judging that a communication between sending/receiving circuit 204 and reader/writer 100 has ended and subsequently receiving a request command.

After the end of a communication carried out with a contactless card, reader/writer 100 can regard such contactless card as a different card in a later communication. This allows the contactless card to change the card ID thereof. Accordingly, it becomes possible to protect the privacy of the cardholder of the contactless card.

Meanwhile, when communication end judgment unit 221 judges that the communication between sending/receiving circuit 204 and reader/writer 100 has ended, random number ID generation unit 210 may generate a new card ID, and store such new card ID into ID storage unit 2081. In this case, it is possible to lo perform in advance a step of generating a new card ID that should be performed at the start of the next communication.

Fourth Embodiment

Figure 20:
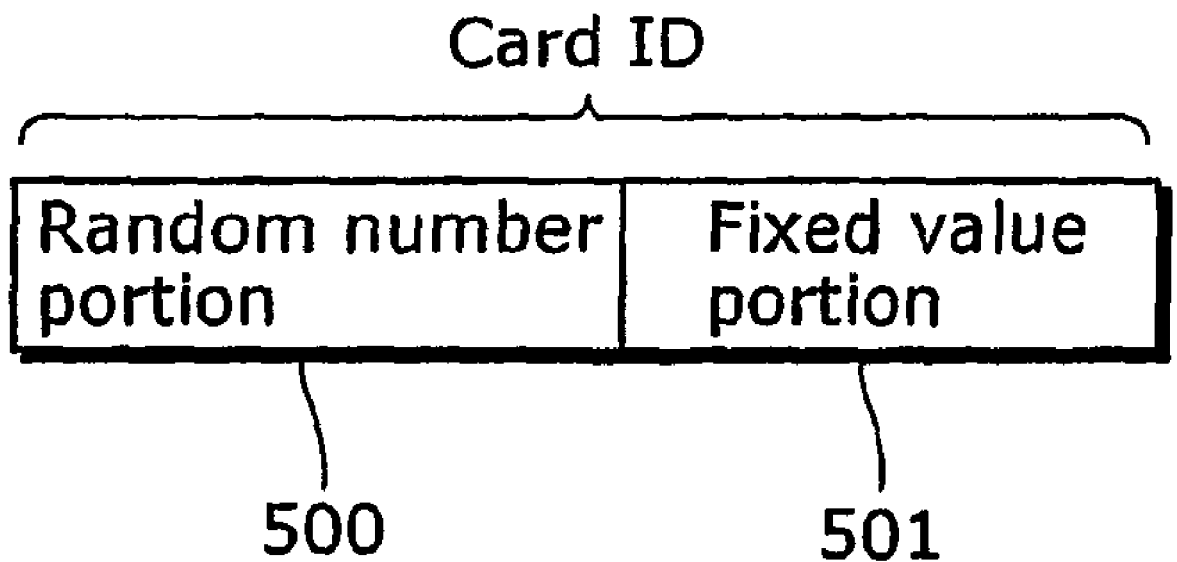
FIG. 20 is a diagram showing a structure of a card ID according to a fourth embodiment.

The aforementioned embodiments have described the case where a card ID is a random number or a fixed value. As shown in FIG. 20, a card ID may be made up of portion 500 that contains a random number and portion 501 that contains a fixed value. The object of the present invention is achievable when the same card ID is used through a set of card identification processes and when the same card ID is not constantly used. Thus, a part of a card ID may be a fixed value.

The fixed value portion in the card ID of a contactless card can include the card issuer's ID, the service type, and the like, with the object of the present invention achievable by the random number portion. Therefore, it is possible for the reader/writer to obtain the card information by checking the fixed value portion in the card ID as well as it becomes possible to prevent the activities of the cardholder from being identified.

In the above case, portion 500 containing a fixed value is generated by random number ID generation unit 210 and portion 501 containing a fixed value is generated by fixed ID generation unit 213.

Furthermore, the card ID may be stored into a non-volatile memory, in which case the fixed value portion of the card ID is rewritable. Accordingly, it becomes possible to further enhance the protection of the cardholder's privacy by the contactless card selecting a card ID depending on the service and storing the value of the selected card ID into the non-volatile memory.

Fifth Embodiment

Figure 21:
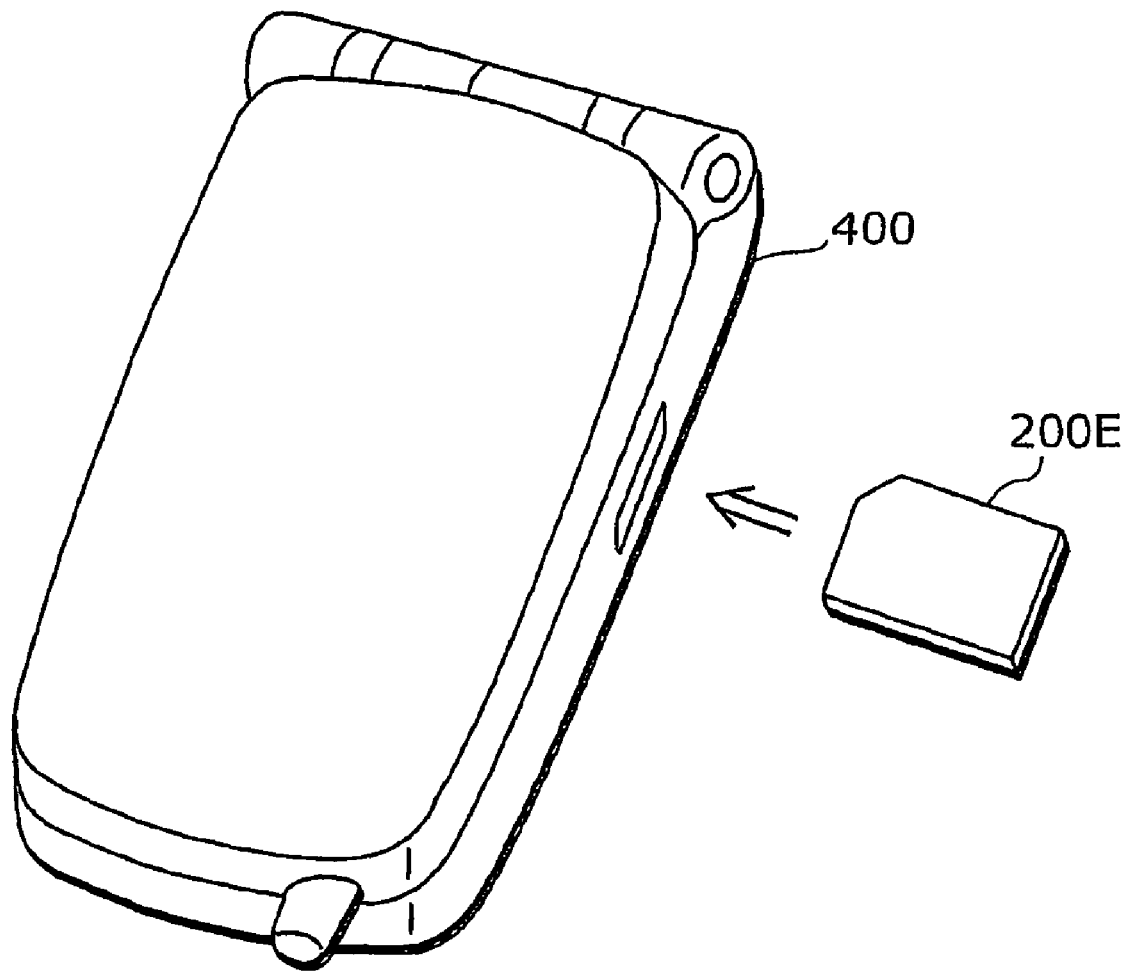
FIG. 21 is an external view showing a mobile terminal device and a contactless card according to a fifth embodiment.
Figure 22:
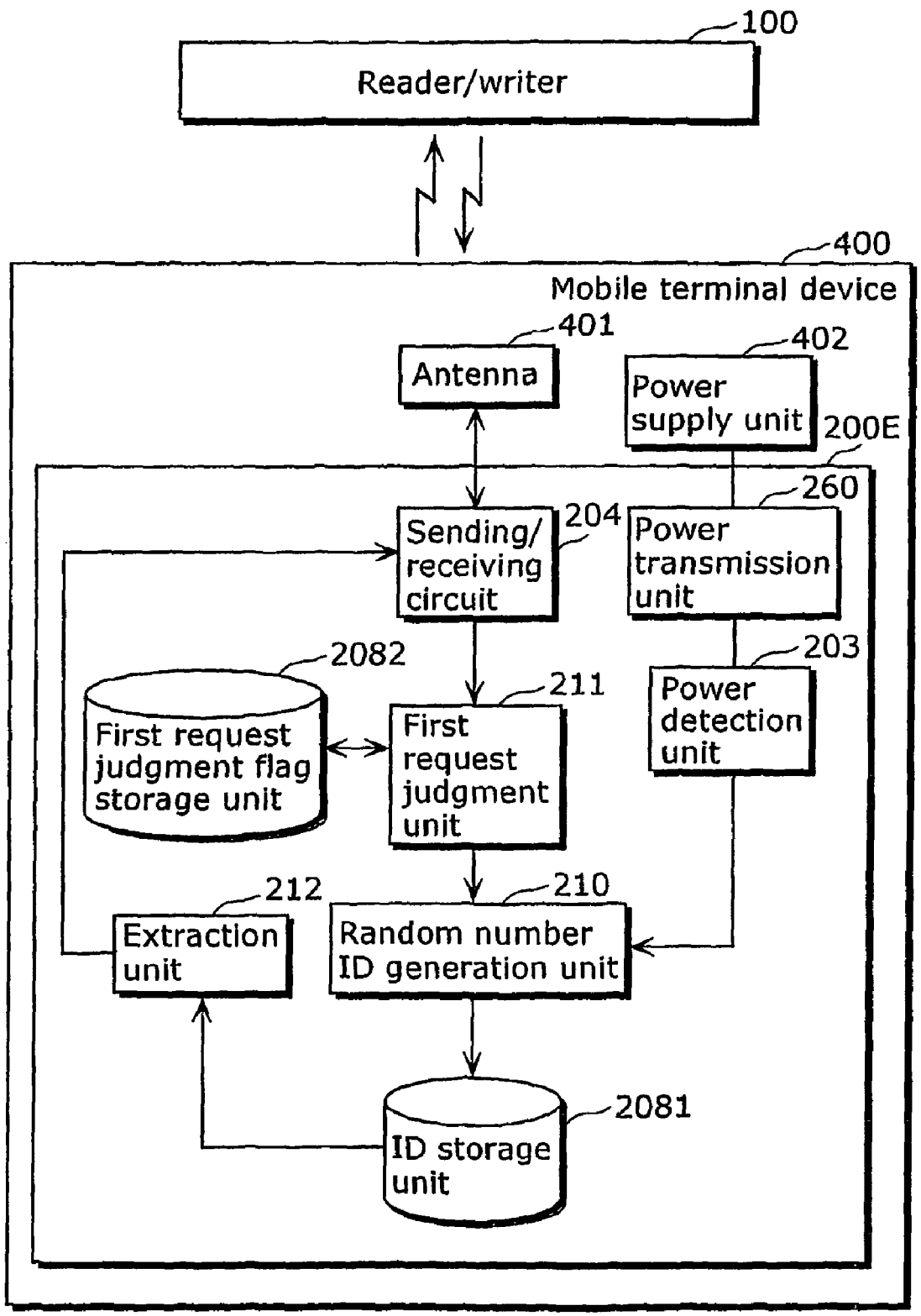
FIG. 22 is a block diagram showing functions of the mobile terminal device and the contactless card according to the fifth embodiment.

As shown in FIG. 21, contactless card 200 may be replaced by contactless card 200E that is stored, when in use, in mobile terminal device 400 such as a mobile phone. FIG. 22 is a diagram showing a structure of mobile terminal device 400 and contactless card 200E.

Contactless card 200E does not have any antennas. When inserted into mobile terminal device 400, contactless card 200E communicates with reader/writer 100, utilizing antenna 401 equipped to mobile terminal device 400. Furthermore, contactless card 200E has power transmission unit 260 instead of power storage unit 202. Power transmission unit 260 transmits, to inside contactless card 200E, power supplied from power supply unit 402 of mobile terminal device 400.

The following describes an operation of contactless card 200E. After power detection unit 203 detects that power transmission unit 260 has transmitted, to inside contactless card 200E, power supplied from power supply unit 402, first request judgment unit 211 makes the following judgment: in the case where sending/receiving circuit 204 has received a request command via antenna 401, first request judgment unit 211 judges whether such received request command is the first request command, or the second or a later request command.

When the received request command is the first request command, random number ID generation unit 210 generates a card ID using a random number, and sending/receiving circuit 204 sends, to reader/writer 100, an initial response that includes the generated card ID via antenna 401. Furthermore, random number ID generation unit 210 stores the generated card ID into ID storage unit 2081.

Meanwhile, when the received request command is the second or a later request command, sending/receiving circuit 204 sends, to reader/writer 100, an initial response that includes the card ID stored in ID storage unit 2081 via antenna 401.

The fifth embodiment also produces the same effect as that of the first embodiment, i.e., the effect of enabling reader/writer 100 to communicate with contactless card 200E in a set of card identification processes, recognizing that reader/writer 100 is communicating with contactless card 200E, and the effect of improving the possibility of protecting the privacy of the cardholder of contactless card 200E.

Supplement 1 to First to Fifth Embodiments

The functions of random number ID generation unit 210, ID storage unit 2081, first request judgment unit 211, extraction unit 212, communication end judgment unit 221, mode judgment unit 214, and fixed ID generation unit 213 that are described in the aforementioned embodiments are typically implemented by the CPU executing computer programs. Such programs to be executed may be stored in a ROM included in a contactless card or may be externally downloaded and stored into a non-volatile memory.

Supplement 2 to First to Fifth Embodiments

The above-described functions may be implemented as an LSI that is an integrated circuit, by being combined with a program and hardware resources such as a CPU, a RAM, a ROM, and a non-volatile memory. Such functions may be incorporated into one chip on a function-by-function basis, or one or more or all of the functions may be incorporated into one chip.

Figure 23:
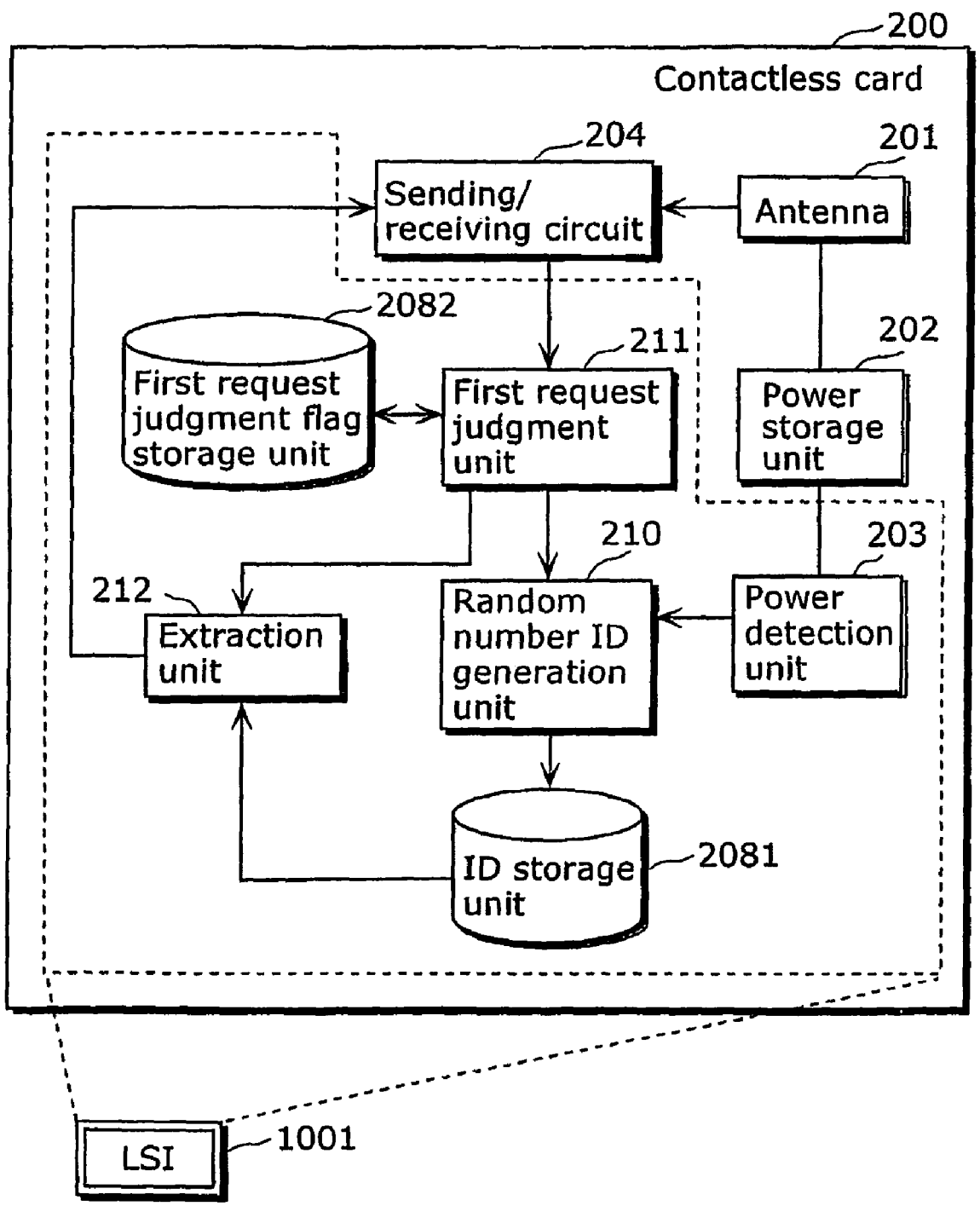
FIG. 23 is a diagram showing a part of the function of the contactless card according to the first embodiment being implemented as an LSI.
Figure 24:
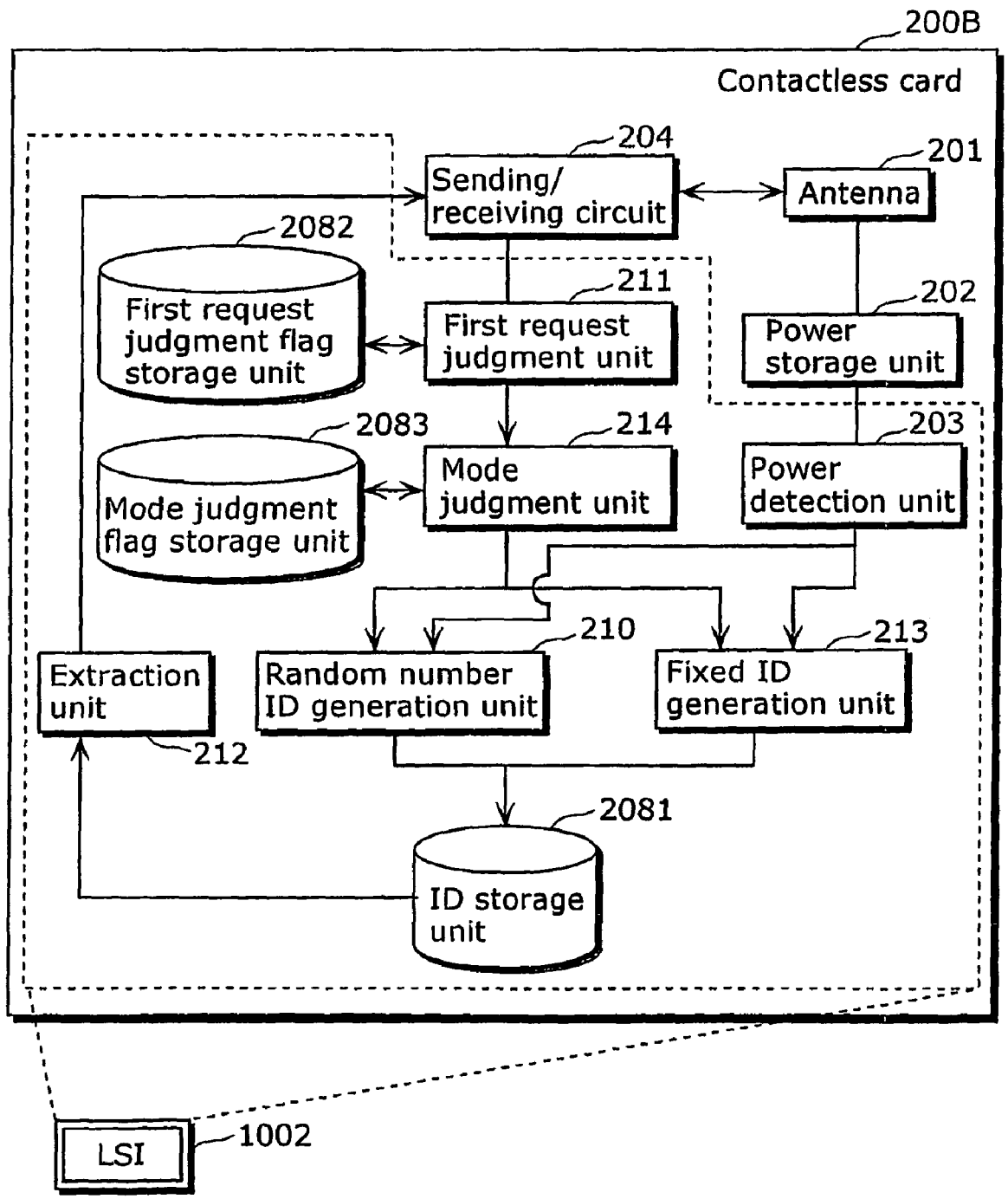
FIG. 24 is a diagram showing a part of the function of the contactless card according to the second embodiment being implemented as an LSI.
Figure 25:
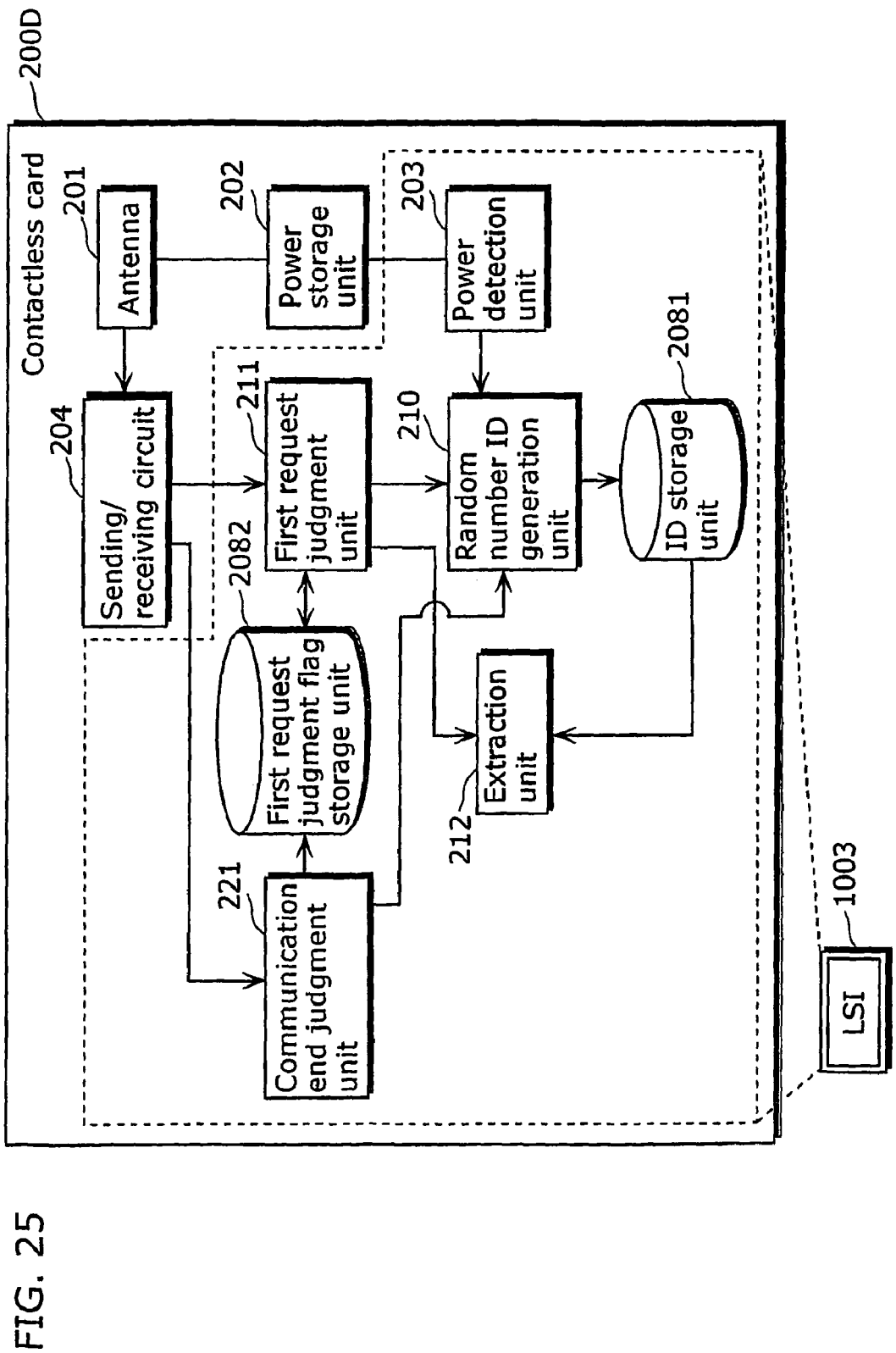
FIG. 25 is a diagram showing a part of the function of the contactless card according to the third embodiment being implemented as an LSI.

FIG. 23, FIG. 24, and FIG. 25 are diagrams showing example cases where the functions of the first embodiment, second embodiment, and third embodiment are respectively incorporated into integrated circuits. LSI 1001, LSI 1002, and LSI 1003 are example integrated circuits. A portion enclosed by the doted lines in each of these diagrams denotes an integrated circuit. The integrated circuits can be called "IC", "system LSI", "super LSI", and "ultra LSI" depending on the integration degree.

It should be noted that LSI is not the only example of the integrated circuits, and thus they may be implemented as personal circuits or general processors. It is also possible to utilize a Field Programmable Gate Array (FPGA) that is programmable after manufacturing of LSI, or a reconfigurable processor in which the connection and settings for the circuit cell in the LSI can be reconfigurable.

Furthermore, along with the arrival of technique for incorporation into an integrated circuit that replaces the LSI owing to a progress in semiconductor technology or another technique that has deviated from it, integration of the above-described functions may be carried out using the newly-arrived technology. Bio-technology may be cited as one of the examples.

Also note that the aforementioned embodiments describe a contactless card that communicates with a reader/writer in compliance with ISO/IEC14443-3 (Type B, initialization and anticollision scheme), but the contactless card according the present invention may be a contactless card that performs a communication in compliance with Type A of ISO/IEC14443-3 or with a standard called Type C.

INDUSTRIAL APPLICABILITY

The contactless card according to the present invention protects its cardholder's privacy through the use of a card ID that is difficult for a third party to guess. Furthermore, it is possible for a reader/writer to communicate with the contactless card of the present invention, recognizing that the reader/writer is communicating with such contactless card. Thus, the contactless card according to the present invention is also applicable for use in a system for performing contactless communication (e.g., RF tag).

The invention claimed is:

1. A contactless card that communicates with a reader/writer after being supplied with electric power, the contactless card having an identifier that identifies the contactless card, the contactless card comprising:
    a power detection unit operable to detect that electric power has been supplied for enabling communication to take place between the contactless card and the reader/writer;
    an identifier determination unit operable to determine an identifier that identifies the contactless card, every time the power detection unit detects that electric power has been supplied for enabling communication to take place between the contactless card and the reader/writer;
    an identifier storage unit operable to hold the identifier determined by the identifier determination unit;
    a receiving unit operable to receive, from the reader/writer, a command requesting that the identifier that identifies the contactless card be sent to the reader/writer;
    a first request judgment unit operable to judge, based on a first request judgment flag, whether the command received by the receiving unit is a first request command or a second or later request command;
    a sending unit operable to send, to the reader/writer, the identifier that identifies the contactless card; and
    a mode judgment unit operable to judge an operation mode included in a contactless mode in which the contactless card operates, by judging whether or not a voltage at a predetermined point in the contactless card is a predetermined voltage,
    wherein the identifier determination unit includes:
    a random identifier generation unit operable to generate an identifier in a random manner; and
    a specific identifier generation unit operable to generate a specific identifier,
    wherein the judged operation mode included in the contactless mode is used to determine, independently of information received by the receiving unit, which one of (i) the random identifier generation unit and (ii) the specific identifier generation unit, is to be used to generate the identifier that identifies the contactless card, and
    wherein the sending unit is operable to send, to the reader/writer, (i) a new identifier determined by the identifier determination unit in the case where the first request judgment unit judges that the command received by the receiving unit is the first request command, and (ii) the identifier held in the identifier storage unit in the case where the first request judgment unit judges that the command received by the receiving unit is the second or later request command.

2. A contactless card according to claim 1,
    wherein every time the power detection unit detects that electric power has been supplied for enabling communication to take place between the contactless card, one of the random identifier generation unit and the specific identifier generation unit generates a new identifier.

3. A contactless card according to claim 1,
    wherein the random identifier generation unit is operable to generate the identifier in a random manner by using a random number.

4. A contactless card according to claim 1, further comprising
    a communication end detection unit operable to detect an end of a communication between the reader/writer and the receiving unit and the sending unit,
    wherein, in a case where the communication end detection unit detects the end of the communication, one of the random identifier generation unit and the specific identifier generation unit generates a new identifier, and the new identifier is stored in the identifier storage unit as the identifier that identifies the contactless card.

5. A contactless card according to claim 1,
    wherein the communication between the reader/writer and the contactless card is in compliance with ISO/IEC14443, and
    the identifier that identifies the contactless card sent by the sending unit is set as a Pseudo-Unique Proximity Integrated Circuit Card Identifier included in a response to the command that is sent from the reader/writer to the receiving unit.

6. A contactless card according to claim 1,
    wherein the operation mode in which the contactless card operates includes: an inspection mode indicating that the contactless card is in an inspection process; and a use mode indicating that the contactless card is in use by a user, and
    wherein, in the inspection mode, the identifier generated by the specific identifier generation unit is used as the identifier that identifies the contactless card, and in the use mode, the identifier generated by the random identifier generation unit is used as the identifier that identifies the contactless card.

7. A contactless card according to claim 6,
    wherein the identifier generated by the specific identifier generation unit is a fixed identifier, and the identifier generated by the random identifier generation unit is a non-fixed identifier.

8. A contactless card according to claim 1,
    wherein the specific identifier generation unit is operable to generate the identifier based on information stored in a read only memory, and
    wherein the information stored in the read only memory is not rewritable.

9. A contactless card according to claim 8,
    wherein the information stored in the read only memory is an identifier that identifies the contactless card, and is provided at a time of manufacture of the contactless card.

10. A contactless card according to claim 1,
    wherein the specific identifier generation unit is operable to generate the identifier based on information stored in a non-volatile memory, and
    wherein the information stored in the non-volatile memory is rewritable.

11. A contactless card according to claim 10,
    wherein the non-volatile memory is one of an electrically erasable programmable read only memory, a ferroelectric random access memory, a magnetoresistive random access memory, and an ovonic unified memory.

12. A contactless card according to claim 1, further comprising:

a voltage measurement unit operable to measure the voltage at the predetermined point in the contactless card; and wiring for fixing the voltage at the predetermined point to a first voltage or a second voltage by connection or disconnection with the predetermined point, wherein the mode judgment unit is operable to judge the operation mode depending on whether the voltage measured by the voltage measurement unit is the first voltage or the second voltage.

13. A contactless card according to claim 1, wherein the identifier generated by the specific identifier generation unit is a fixed identifier, and the identifier generated by the random identifier generation unit is a non-fixed identifier.

14. A communication method performed by a contactless card to send an identifier that identifies the contactless card, the contactless card communicating with a reader/writer after being supplied with electric power, the method comprising:

detecting that electric power has been supplied for enabling communication to take place between the contactless card and the reader/writer;

receiving, from the reader/writer, a command requesting that the identifier that identifies the contactless card be sent to the reader/writer;

judging, based on a first request judgment flag, whether the command received in said receiving is a first request command or a second or later request command;

judging an operation mode included in a contactless mode in which the contactless card operates by judging whether or not a voltage at a predetermined point in the contactless card is a predetermined voltage;

determining, depending on said judged operation mode included in the contactless mode in said judging of the operation mode, and independently of information received from the reader/writer in said receiving, whether the identifier that identifies the contactless card is to be a random identifier or a specific identifier, said determining being performed every time said detecting detects that electric power has been supplied for enabling communication to take place between the contactless card and the reader/writer;

generating, based on said determining, the random identifier or the specific identifier, the generated identifier to be used as the identifier that identifies the contactless card;

storing the generated identifier into a storage unit; and sending, to the reader/writer, (i) a new identifier generated in said generating in the case where it is judged in said judging, based on the first request judgment flag, that the command received in said receiving is the first request command, and (ii) the generated identifier stored into the storage unit in said storing in the case where it is judged in said judging, based on the first request judgment flag, that the command received in said receiving is the second or later request command.

15. The communication method according to claim 14, wherein the specific identifier is a fixed identifier, and the random identifier is a non-fixed identifier.

16. An integrated circuit in a contactless card that communicates with a reader/writer after being supplied with electric power, the contactless card having an identifier that identifies the contactless card, the integrated circuit comprising:

a power detection unit operable to detect that electric power has been supplied for enabling communication to take place between the contactless card and the reader/writer;

an identifier determination unit operable to determine an identifier that identifies the contactless card, every time the power detection unit detects that electric power has been supplied for enabling communication to take place between the contactless card and the reader/writer;

an identifier storage unit operable to hold the identifier determined by the identifier determination unit;

a receiving unit operable to receive, from the reader/writer, a command requesting that the identifier that identifies the contactless card be sent to the reader/writer;

a first request judgment unit operable to judge, based on a first request judgment flag, whether the command received by the receiving unit is a first request command or a second or later request command;

a sending unit operable to send, to the reader/writer, the identifier that identifies the contactless card; and a mode judgment unit operable to judge an operation mode included in a contactless mode in which the contactless card operates by judging whether or not a voltage at a predetermined point in the contactless card is a predetermined voltage, wherein the identifier determination unit includes:

a random identifier generation unit operable to generate an identifier in a random manner; and a specific identifier generation unit operable to generate a specific identifier, wherein the judged operation mode included in the contactless mode is used to determine, independently of information received by the receiving unit, which one of (i) the random identifier generation unit and (ii) the specific identifier generation unit, is to be used to generate the identifier that identifies the contactless card, and wherein the sending unit is operable to send, to the reader/writer, (i) a new identifier determined by the identifier determination unit in the case where the first request judgment unit judges that the command received by the receiving unit is the first request command, and (ii) the identifier held in the identifier storage unit in the case where the first request judgment unit judges that the command received by the receiving unit is the second or later request command.

17. A program embodied on a storage medium for sending an identifier that identifies a contactless card, the contactless card being able to communicate with a reader/writer after being supplied with electric power, the program causing a computer to execute a method comprising:

detecting that electric power has been supplied for enabling communication to take place between the contactless card and the reader/writer;

receiving, from the reader/writer, a command requesting that the identifier that identifies the contactless card be sent to the reader/writer;

judging, based on a first request judgment flag, whether the command received in said receiving is a first request command or a second or later request command;

judging an operation mode included in a contactless mode in which the contactless card operates by judging whether or not a voltage at a predetermined point in the contactless card is a predetermined voltage;

determining, depending on said judged operation mode included in the contactless mode in said judging of the operation mode, and independently of information received from the reader/writer in said receiving, whether the identifier that identifies the contactless card is to be a random identifier or a specific identifier, said determining being performed every time said detecting detects that electric power has been supplied for enabling communication to take place between the contactless card and the reader/writer;

generating, based on said determining, the random identifier or the specific identifier, the generated identifier to be used as the identifier that identifies the contactless card;

storing the generated identifier into a storage unit; and sending, to the reader/writer, (i) a new identifier generated in said generating in the case where it is judged in said judging, based on the first request judgment flag, that the command received in said receiving is the first request command, and (ii) the generated identifier stored into the storage unit in said storing in the case where it is judged in said judging, based on the first request judgment flag, that the command received in said receiving is the second or later request command.

18. A storage medium in which a program is stored for sending an identifier that identifies a contactless card, the contactless card being able to communicate with a reader/writer after being supplied with electric power, the program causing a computer to execute a method comprising:

detecting that electric power has been supplied for enabling communication to take place between the contactless card and the reader/writer;

receiving, from the reader/writer, a command requesting that the identifier that identifies the contactless card be sent to the reader/writer;

judging, based on a first request judgment flag, whether the command received in said receiving is a first request command or a second or later request command;

judging an operation mode included in a contactless mode in which the contactless card operates by judging whether or not a voltage at a predetermined point in the contactless card is a predetermined voltage;

determining, depending on said judged operation mode included in the contactless mode in said judging of the operation mode, and independently of information received from the reader/writer in said receiving, whether the identifier that identifies the contactless card is to be a random identifier or a specific identifier, said determining being performed every time said detecting detects that electric power has been supplied for enabling communication to take place between the contactless card and the reader/writer;

generating, based on said determining, the random identifier or the specific identifier, the generated identifier to be used as the identifier that identifies the contactless card;

storing the generated identifier into a storage unit; and sending, to the reader/writer, (i) a new identifier generated in said generating in the case where it is judged in said judging, based on the first request judgment flag, that the command received in said receiving is the first request command, and (ii) the generated identifier stored into the storage unit in said storing in the case where it is judged in said judging, based on the first request judgment flag, that the command received in said receiving is the second or later request command.

* * * * *